United States Patent
Choi et al.

(10) Patent No.: US 11,320,889 B2
(45) Date of Patent: May 3, 2022

(54) FUNCTION OPERATING METHOD AND ELECTRONIC APPARATUS SUPPORTING SAME

(71) Applicant: Samsung Electronics Co., Ltd., Gyeonggi-do (KR)

(72) Inventors: Seung Chul Choi, Gyeonggi-do (KR); Bong Su Chun, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 167 days.

(21) Appl. No.: 15/765,653

(22) PCT Filed: Nov. 1, 2016

(86) PCT No.: PCT/KR2016/012468
§ 371 (c)(1),
(2) Date: Apr. 3, 2018

(87) PCT Pub. No.: WO2017/086631
PCT Pub. Date: May 26, 2017

(65) Prior Publication Data
US 2018/0292882 A1    Oct. 11, 2018

(30) Foreign Application Priority Data
Nov. 20, 2015 (KR) .......................... 10-2015-0163324

(51) Int. Cl.
*G06F 1/3234* (2019.01)
*G06F 1/3206* (2019.01)
(Continued)

(52) U.S. Cl.
CPC .......... *G06F 1/3265* (2013.01); *G06F 1/3206* (2013.01); *G06F 1/3218* (2013.01);
(Continued)

(58) Field of Classification Search
CPC .... G06F 1/3265; G06F 1/3206; G06F 1/3218; G06F 1/3231; G06F 3/04883; G09G 3/00; H04W 52/02; Y02D 70/26
See application file for complete search history.

(56) References Cited

U.S. PATENT DOCUMENTS 7,855,636 B2 * 12/2010 Martin .................. G08B 29/24
340/522
7,873,849 B2    1/2011 Mucignat et al.
(Continued)

FOREIGN PATENT DOCUMENTS

CN    101866231 A    10/2010
CN    102713788 A    10/2012
(Continued)

OTHER PUBLICATIONS

European Search Report dated Jun. 25, 2018.
Chinese Search Report dated Jan. 15, 2021.

*Primary Examiner* — Phil K Nguyen
*Assistant Examiner* — Gayathri Sampath
(74) *Attorney, Agent, or Firm* — Cha & Reiter, LLC.

(57) ABSTRACT

Disclosed is an electronic apparatus comprising a memory which is electrically connected to a processor and in which at least one command associated with the execution of the processor is stored, wherein the command is configured such that information on the frequency of the woken-up state of a display for a designated period of time is collected upon execution of the processor and that the information on the frequency of the woken-up state is compared with designated conditions, and a sensitivity associated with the detection of the arrangement status of the electronic apparatus is adjusted or maintained according to whether the conditions are satisfied or not. Other various embodiments as understood from the specification are possible.

18 Claims, 14 Drawing Sheets

(51) Int. Cl.
*G06F 1/3218* (2019.01)
*G06F 1/3231* (2019.01)
*G06F 3/0488* (2013.01)
*H04W 52/02* (2009.01)
*G09G 3/00* (2006.01)
*G06F 3/04883* (2022.01)

(52) U.S. Cl.
CPC ........ *G06F 1/3231* (2013.01); *G06F 3/04883* (2013.01); *H04W 52/02* (2013.01); *G09G 3/035* (2020.08); *G09G 2330/022* (2013.01); *Y02D 10/00* (2018.01); *Y02D 30/70* (2020.08)

(56) References Cited

U.S. PATENT DOCUMENTS

| | | | |
|---|---|---|---|
| 8,234,512 B2 | 7/2012 | Mucignat et al. | |
| 8,344,998 B2 | 1/2013 | Fitzgerald et al. | |
| 8,392,735 B2 | 3/2013 | Mucignat et al. | |
| 8,581,870 B2 | 11/2013 | Bokma et al. | |
| 8,933,905 B2 | 1/2015 | Bokma et al. | |
| 9,354,686 B2 | 5/2016 | Kim et al. | |
| 9,400,581 B2 | 7/2016 | Bokma et al. | |
| 9,588,568 B2 | 3/2017 | Kim et al. | |
| 9,710,048 B2* | 7/2017 | Zhao | G06F 1/3218 |
| 9,753,517 B2 | 9/2017 | Teshome et al. | |
| 9,904,410 B2 | 2/2018 | Bokma et al. | |
| 9,933,833 B2 | 4/2018 | Tu et al. | |
| 10,101,793 B2 | 10/2018 | Tu et al. | |
| 10,120,431 B2 | 11/2018 | Tu et al. | |
| 10,296,136 B2 | 5/2019 | Bokma et al. | |
| 10,303,239 B2 | 5/2019 | Tu et al. | |
| 2004/0125073 A1* | 7/2004 | Potter | G06F 1/1626 345/156 |
| 2005/0154798 A1* | 7/2005 | Nurmi | G06F 1/1626 710/1 |
| 2009/0195497 A1 | 8/2009 | Fitzgerald et al. | |
| 2010/0235667 A1 | 9/2010 | Mucignat et al. | |
| 2010/0273461 A1* | 10/2010 | Choi | G01C 25/00 455/414.1 |
| 2011/0093729 A1 | 4/2011 | Mucignat et al. | |
| 2012/0179300 A1* | 7/2012 | Warren | B01D 46/0086 700/278 |
| 2012/0297226 A1 | 11/2012 | Mucignat et al. | |
| 2013/0265248 A1* | 10/2013 | Nagahara | G06F 3/011 345/173 |
| 2014/0035856 A1 | 2/2014 | Bokma et al. | |
| 2014/0143568 A1 | 5/2014 | Kim et al. | |
| 2014/0171124 A1* | 6/2014 | Goglin | G06F 1/3206 455/456.4 |
| 2014/0358473 A1* | 12/2014 | Goel | G06F 3/05 702/141 |
| 2015/0092520 A1 | 4/2015 | Robison et al. | |
| 2015/0177945 A1 | 6/2015 | Sengupta et al. | |
| 2015/0205335 A1 | 7/2015 | Teshome et al. | |
| 2015/0277533 A1 | 10/2015 | Kim et al. | |
| 2015/0277572 A1 | 10/2015 | Verplaetse et al. | |
| 2015/0356035 A1* | 12/2015 | Singh | G06F 1/3203 712/244 |
| 2016/0007934 A1* | 1/2016 | Arnold | A61B 5/4809 600/595 |

FOREIGN PATENT DOCUMENTS

| | | |
|---|---|---|
| CN | 104460939 A | 3/2015 |
| CN | 204731730 U | 10/2015 |
| KR | 2001-0000055 A | 1/2001 |
| WO | 2011-028326 A1 | 3/2011 |

* cited by examiner

| WRIST UP SENSITIVITY | X-AXIS ANGLE | Z-AXIS ANGLE | ACCELERATION | NUMBER OF SAMPLES SATISFYING CONDITION |
|---|---|---|---|---|
| FIRST LEVEL | 15 TO 90 DEGREES | -30 TO 30 DEGREES | 0.8G~1.2G | FOUR |
| SECOND LEVEL | 10 TO 90 DEGREES | -30 TO 30 DEGREES | 0.8G~1.2G | FOUR |
| THIRD LEVEL | 7.5 TO 90 DEGREES | -30 TO 30 DEGREES | 0.8G~1.2G | THREE |
| FOURTH LEVEL | 5 TO 90 DEGREES | -30 TO 30 DEGREES | 0.8G~1.2G | THREE |
| FIFTH LEVEL | 2.5 TO 90 DEGREES | -30 TO 30 DEGREES | 0.8G~1.2G | TWO |
| SIXTH LEVEL | 0 TO 90 DEGREES | -30 TO 30 DEGREES | 0.8G~1.2G | TWO |

FUNCTION OPERATING METHOD AND ELECTRONIC APPARATUS SUPPORTING SAME

CLAIM OF PRIORITY

This application is a National Phase Entry of PCT International Application No. PCT/KR2016/012468, which was filed on Nov. 1, 2016 and claims a priority to Korean Patent Application No. 10-2015-0163324, which was filed on Nov. 20, 2015, the contents of which are incorporated herein by reference.

TECHNICAL FIELD

Embodiments of the present disclosure relate to control of function settings

BACKGROUND ART

In recent years, various forms of wearable devices designed to be worn on a user's body have been developed. For example, wearable devices designed to be worn on a user's ear, wrist, waist, or the like have been developed.

DETAILED DESCRIPTION OF THE INVENTION

Technical Problem

In the case of a wrist-wearable device among conventional wearable devices, a user may frequently check functions of the device. However, since the wrist-wearable device has a limitation in mechanical size, a limited battery is mounted in the wrist-wearable device. Due to the limited battery capacity, the performance of the wearable device may be deteriorated and the user may have the inconvenience of having to frequently charge the device.

Aspects of the present disclosure are to address at least the above-mentioned problems and/or disadvantages and to provide at least the advantages described below. Accordingly, an aspect of the present disclosure is to provide a function operating method for activating a device when a user actually uses the device, thereby easily obtaining information and saving battery power, and to provide an electronic device supporting the same.

Technical Solution

In accordance with an aspect of the present disclosure, an electronic device includes a sensor that collects sensor information related to an arrangement state of the electronic device, a display having a wake-up state in relation to the arrangement state of the electronic device, a processor electrically connected with the sensor or the display, and a memory electrically connected with the processor and storing at least one instruction associated with execution of the processor. The instruction, when executed, causes the processor to collect wake-up frequency information of the display for a specified period of time, to compare the wake-up frequency information with a specified condition, and to adjust or maintain sensitivity associated with detection of the arrangement state of the electronic device, depending on whether the specified condition is satisfied.

In accordance with another aspect of the present disclosure, a method includes collecting wake-up frequency information of a display of an electronic device for a specified period of time, comparing the wake-up frequency information with a specified condition, and adjusting sensitivity associated with detection of an arrangement state of the electronic device, in response to the comparing of the wake-up frequency information with the specified condition.

Other aspects, advantages, and salient features of the disclosure will become apparent to those skilled in the art from the following detailed description, which, taken in conjunction with the annexed drawings, discloses various embodiments of the present disclosure.

Advantageous Effects of the Invention

According to embodiments of the present disclosure, it is possible to achieve an improvement in current consumption and an increase in battery life while maintaining usability of an electronic device. In addition, the present disclosure may provide various effects that are directly or indirectly recognized.

DESCRIPTION OF THE DRAWINGS

FIG. 2B illustrates sensor information depending on a first arrangement state according to an embodiment.

MODE FOR INVENTION

Figure 1:
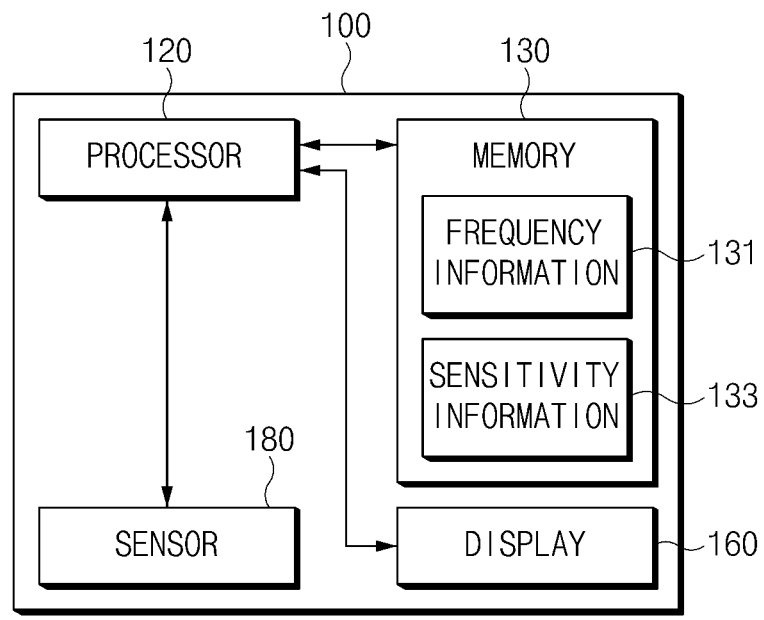
FIG. 1 illustrates a configuration of an electronic device according to an embodiment.

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar elements may be marked by similar reference numerals.

In this disclosure, the expressions "have", "may have", "include" and "comprise", or "may include" and "may comprise" used herein indicate existence of corresponding features (e.g., elements such as numeric values, functions, operations, or components) but do not exclude presence of additional features.

In this disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in this disclosure may be used to refer to various elements regardless of the order and/or the priority and to distinguish the relevant elements from other elements, but do not limit the elements. For example, "a first user device" and "a second user device" indicate different user devices regardless of the order or priority. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used in this disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in this disclosure are used to describe specified embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of this disclosure. In some cases, even if terms are terms which are defined in this disclosure, they may not be interpreted to exclude embodiments of this disclosure.

An electronic device according to various embodiments of this disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of this disclosure may not be limited to the above-described electronic devices and may include other electronic devices and new electronic devices according to the development of technologies.

Hereinafter, electronic devices according to various embodiments will be described with reference to the accompanying drawings. In this disclosure, the term "user" may refer to a person who uses an electronic device or may refer to a device (e.g., an artificial intelligence electronic device) that uses the electronic device.

FIG. 1 illustrates a configuration of an electronic device according to an embodiment.

Referring to FIG. 1, an electronic device 100 according to an embodiment may include a processor 120, a memory 130, a display 160, and a sensor 180. According to various embodiments, the electronic device 100 may further include a communication interface, an input/output interface, and the like.

The electronic device 100 may activate the display 160 when the electronic device 100 enters a first arrangement state, based on specified sensor settings. According to various embodiments, the electronic device 100 may output specified information (e.g., a watch image or a message or call reception history) with the activation of the display 160. The electronic device 100 may deactivate the display 160 after a predetermined period of time passes, or when the electronic device 100 enters a second arrangement state. The first arrangement state may correspond to, for example, a state in which a wrist on which the electronic device 100 is worn or the X-axis angle in a holding state is within a first specified angle range, the Z-axis angle of the electronic device 100 is within the first specified angle range, and acceleration according to a movement of the wrist or the hand holding the electronic device 100 is above a predetermined acceleration. For example, the first arrangement state may be an arrangement state that corresponds to an action of raising the wrist or the hand holding the electronic device 100 such that the display 160 of the electronic device 100 worn on the wrist or held by the hand is located within a predetermined range with respect to the user's line of sight. Furthermore, the second arrangement state may correspond to a state other than the first arrangement state or a state in which the X-axis angle and the Z-axis angle are within a second range rather than the first range. For example, the second arrangement state may include a predetermined state in which the display 160 of the electronic device 100 is not located in the user's gaze direction. The X-axis angle may include, for example, the angle of a direction in which the display 160 of the electronic device 100 is directed with respect to the ground. For example, the X-axis angle may be zero degrees in the case where the display 160 is directed toward the sky, with the electronic device 100 worn on the wrist. The X-axis angle may be a plus (+) angle in the case where the display 160 rotates rightwards due to the twist of the wrist and may be a minus (−) angle in the case where the display 160 rotates leftwards. The Z-axis angle may include, for example, an angle depending on a state in which the electronic device 100 is rotated with respect to the horizontal direction. For example, the Z-axis angle may be zero degrees in the case where the arm is disposed in the horizontal direction, with the electronic device 100 worn on the wrist. The Z-axis angle may be a minus (−) angle in the case where the arm is inclined toward the ground and may be a plus (+) angle in the case where the arm is moved upwards with respect to the horizontal direction. In regard to the determination of a wearing state, the electronic device 100 may determine whether the display 160 is changed from a turned-off state (a sleep state) to a turned-on state (a wake-up state), and if so, the electronic device 100 may determine whether the electronic device 100 is close to an object (e.g., the wrist), through a proximity sensor (e.g., an IR sensor). Alternatively, even when the display 160 is in a turned-off state (a sleep state), the electronic device 100 may determine whether the electronic device 100 is close to an object (e.g., the wrist), through a proximity sensor (e.g., an IR sensor). When it is determined that the electronic device 100 is not close to an object, the electronic device 100 may recognize that the electronic device 100 is not worn, and when it is determined that the electronic device 100 is close to an object, the electronic device 100 may recognize that the electronic device 100 is worn.

The electronic device 100 may adjust the sensitivity of the sensor 180 such that the number of times that the display 160 enters a wake-up state, in which the display 160 is activated, is within a specified range. For example, the number of times that the display 160 is in a wake-up state may relatively increase with an increase in the sensitivity (or the sensitivity level) and may relatively decrease with a decrease in the sensitivity. According to an embodiment, the electronic device 100 may lower the sensitivity level of the sensor 180 to reduce the number of times that the display 160 enters a wake-up state, in the case where the number of times that the electronic device 100 automatically wakes up the display 160 based on sensor information for a specified period of time is greater than or equal to a specified number of times. According to various embodiments, the electronic device 100 may raise the sensitivity level of the sensor 180 to facilitate the entrance of the display 160 into a wake-up state, in the case where the number of times that the display 160 is in a wake-up state for a specified period of time is less than a specified number of times. According to various embodiments, the electronic device 100 may modify the specified sensitivity level. Alternatively, in regard to an increase in the sensitivity of the sensor 180, the electronic device 100 may adjust the sensitivity by adjusting at least one of an angle range of the sensor 180 by which the electronic device 100 is in the first arrangement state, a specified acceleration range, the number of samplings or a sampling interval in a state corresponding to a specified angle range. The number of samplings may correspond to, for example, the number of times that a state in which the electronic device 100 is located within a specified angle range with respect to a specified axis (e.g., the X-axis or the Z-axis) is sampled at a predetermined time interval (e.g., 20 ms).

According to various embodiments, the electronic device 100 may be a wearable device that is worn on a wrist. The wake-up state may include, for example, a state in which the electronic device 100 is worn on a user's left wrist and then the processor 120 activates the display 160 and outputs specified information, with the user's left hand in the first arrangement state. The first arrangement state may include, for example, a state in which all or at least one of the following three conditions is satisfied: to enable the user to observe the back of the user's left wrist on which the electronic device 100 is worn, the user's left arm is bent at a specified angle toward the Z-axis; the user's left arm is located within a predetermined angle range with respect to the X-axis; and the user's left arm moves at a predetermined acceleration. The second arrangement state may include, for example, a state in which the back of the user's left wrist on which the electronic device 100 is worn is not observed by the user. For example, the second arrangement state may include at least one of a state in which the user's left arm on which the electronic device 100 is worn is directed toward the ground, a state in which the user's left wrist is turned at a predetermined angle or more toward the outside, and a state in which acceleration is measured to be less than or equal to a specified reference value.

The memory 130 may store an operating system necessary for operating the electronic device 100. Furthermore, the memory 130 may store an adjustment program associated with adjusting the sensitivity of the sensor 180 according to an embodiment of the present disclosure. For example, the adjustment program may include a set of instructions (or a routine, a class, a library, a function, a context, a structure, or the like) that is set to collect frequency information. The adjustment program may include a set of instructions that is set to compare collected frequency information and a specified range of values (or a reference value) and to make an adjustment to the sensitivity or maintain the previous sensitivity depending on the comparison result and a set of instructions that is set to output a user interface associated with adjusting the sensitivity. For example, the instruction sets included in the adjustment program may be loaded into the processor 120 and may be used to perform a sensitivity adjustment function, based on the execution of the corresponding instruction sets.

The memory 130 may store frequency information 131 and sensitivity information 133. The frequency information 131 may be information about a wake-up frequency of the display 160. As described above, the display 160 may be changed from a sleep state to a wake-up state when the display 160 is in the first arrangement state. For example, the frequency information 131 may be collected and accumulated with the activation of the sensor 180. Furthermore, the frequency information 131 may include information collected in the state in which the electronic device 100 is worn. According to various embodiments, the frequency information 131 may include information about a wake-up state while the electronic device 100 is not worn. The frequency information 131 may include time information about the time when the frequency information 131 is collected. The frequency information 131 may be grouped every predetermined time or daily. According to various embodiments, the frequency information 131 may be reset every predetermined time. For example, the frequency information 131 may be initialized daily.

The sensitivity information 133 may include a specified range of values or a reference value to be compared with the frequency information 131. The sensitivity information 133 may include an appropriate range of values depending on usability. The appropriate range of values may be used to compare wake-up frequency information with a specified condition. The sensitivity information 133 may be differently set depending on a battery capacity of the electronic device 100. Alternatively, the sensitivity information 133 may be differently set depending on user information (e.g., gender, age, status, job, or the like). According to various embodiments, the frequency information 133 may include the previous sensitivity information.

The sensor 180 may collect at least one piece of sensor information for analysis of an arrangement state associated with the entrance of the display 160 into a wake-up state or a sleep state. For example, the sensor 180 may include a sensor (e.g., a proximity sensor, a biometric sensor, an illuminance sensor, a switch sensor, or the like) that is associated with a determination as to whether the electronic device 100 is worn or not. The sensor 180 may include at least one sensor (e.g., a geo-magnetic sensor, an acceleration sensor, or an angular velocity sensor) for sensing whether a surface of the display 160 of the electronic device 100 is in a specified arrangement state (e.g., a state in which the electronic device 100 has a predetermined rotational acceleration or more while an arm on which the electronic device 100 is worn is being moved upwards and the back of a wrist is being rotated at a specified angle toward a user's gaze). The sensor 180 may transmit the collected sensor information to the processor 120.

The display 160 may output at least one screen associated with operating the electronic device 100. According to an embodiment, the display 160 may output watch information. Alternatively, the display 160 may output information about the receipt of a message, the receipt of a telephone call, or a message or telephone call reception history. The display 160 may include at least one of a sleep state and a wake-up state. Alternatively, the display 160 may include at least one of a deep sleep state, a light sleep state, and a wake-up state. According to an embodiment, the display 160 may be changed from a sleep state to a wake-up state when the electronic device 100 enters the first arrangement state described above. In this operation, the display 160 already in a wake-up state may maintain the wake-up state when the electronic device 100 enters the first arrangement state. When the electronic device 100 enters the second arrangement state, the display 160 may be changed from a wake-up state to a sleep state, or the display 160 already in a sleep state may maintain the sleep state. According to various embodiments, the display 160 may be changed into a sleep state when a specified period of time has elapsed after the first arrangement state. In this operation, the display 160 may be changed into a light sleep state or a deep sleep state, depending on the elapsed time. The light sleep state may include, for example, a state in which the display 160, when returning to a wake-up state after a sleep state, displays an execution screen of a function executed in a wake-up state right before the sleep state as a wake-up state screen. The deep sleep state may include a state in which the display 160, when returning to a wake-up state after a sleep state, displays a screen for making a request to release a screen saver or a lock screen. According to various embodiments, in the case where a function of providing an always-on screen is applied, the display 160 may be changed from a light sleep state to a wake-up state when the electronic device 100 enters the first arrangement state. In the light sleep state, the display 160 may display time under the control of the processor 120.

The processor 120 may process signals and data associated with operating the electronic device 100. According to an embodiment, the processor 120 may change the display 160 into a sleep state or a wake-up state, in response to a user input or depending on sensor information provided by the sensor 180. In this operation, the processor 120 may make an adjustment to the sensitivity for the first arrangement state or the second arrangement state. For example, in the case where the display 160 enters a wake-up state more than a specified number of times, the processor 120 may lower the sensitivity (or the sensitivity level) to decrease the number of times that the display 160 enters a wake-up state. According to various embodiments, in the case where the display 160 enters a wake-up state less than a specified number of times, the processor 120 may raise the sensitivity (or the sensitivity level) to increase the number of times that the display 160 enters a wake-up state. According to various embodiments, the processor 120 may adjust the sensitivity of the sensor 180 such that the sensitivity is not less than or not more than a specified magnitude. According to various embodiments, the processor 120 may adjust the sensitivity in relation to the entrance of the display 160 into a sleep state. For example, the processor 120 may adjust (e.g., increase) a range value of the second arrangement state (e.g., an angle by which the electronic device 100 is disposed, an acceleration range, the number of samplings, or the like) to allow the display 160 to easily enter a sleep state. Alternatively, the processor 120 may adjust the sensitivity to make it more difficult for the display 160 to enter a sleep state, by decreasing the range value of the second arrangement state (e.g., decreasing an arrangement angle range, increasing acceleration, or increasing the number of samplings to be obtained, as a condition for the entrance into a sleep state).

Figure 2A:
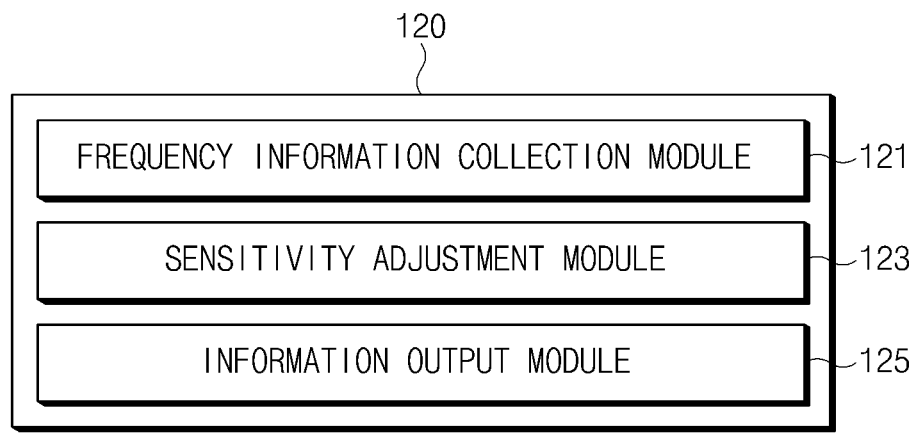
FIG. 2A illustrates a processor 120 according to an embodiment.

FIG. 2A illustrates the processor 120 according to an embodiment.

Referring to FIG. 2A, the processor 120 may include a frequency information collection module 121, a sensitivity adjustment module 123, and an information output module 125.

The frequency information collection module 121 may collect the number of times that the display 160 is changed into a wake-up state according to specified settings, with the electronic device 100 in the first arrangement state. The frequency information collection module 121 may collect wake-up state change time information together. According to various embodiments, the frequency information collection module 121 may collect wake-up frequency information every predetermined time (e.g., every several minutes, hourly, every several hours, or daily). The frequency information collection module 121 may be initialized and may correct new frequency information after transmitting frequency information collected within a specified period of time to the sensitivity adjustment module 123.

The sensitivity adjustment module 123 may adjust the sensitivity associated with the entrance of the display 160 into a wake-up state, based on frequency information collected by the frequency information collection module 121. For example, the sensitivity adjustment module 123 may compare frequency information collected for a specified period of time with the sensitivity information 133 stored in the memory 130 to determine whether the frequency information collected for the specified period of time (e.g., the number of times that the display 160 enters a wake-up state) is greater than or less than the sensitivity information 133 (e.g., a specified number of times) or is within a specified range. The sensitivity adjustment module 123 may lower the sensitivity associated with the entrance of the display 160 into a wake-up state in the case where the wake-up frequency information collected for the specified period of time is greater than the sensitivity information 133. For example, the sensitivity adjustment module 123 may control the display 160 to more infrequently enter a wake-up state, by decreasing a sensor value range related to the first arrangement state of the electronic device 100. Alternatively, the sensitivity adjustment module 123 may control the display 160 to more infrequently enter a wake-up state, by setting a sampling time interval related to the first arrangement state to a longer time interval. In another case, the sensitivity adjustment module 123 may control the display 160 to more infrequently enter a wake-up state, by increasing the number of samplings for the entrance of the display 160 into a wake-up state (e.g., a condition for the first arrangement state being considered to one sample). According to various embodiments, the sensitivity adjustment module 123 may adjust the sensitivity of the sensor 180 every predetermined time or daily.

According to various embodiments, the sensitivity adjustment module 123 may raise the sensitivity associated with the entrance of the display 160 into a wake-up state in the case where the wake-up frequency information collected for the specified period of time is less than the sensitivity information 133. For example, the sensitivity adjustment module 123 may control the display 160 to more frequently enter a wake-up state, by increasing a sensor value range related to the first arrangement state of the electronic device 100. Alternatively, the sensitivity adjustment module 123 may control the display 160 to more frequently enter a wake-up state, by setting a sampling time interval related to the first arrangement state to a longer time interval, or by increasing the number of samplings.

According to various embodiments, the sensitivity adjustment module 123 may adjust the sensitivity in relation to the entrance of the electronic device 100 into the second arrangement state. For example, the sensitivity adjustment module 123 may control the display 160 to enter a sleep state, based on the X-axis angle, the Z-axis angle, the acceleration, the number of samplings satisfying a condition, or the like that corresponds to the second arrangement state. According to an embodiment, in the case where wake-up frequency information of the display 160 is greater than or equal to a specified number of times, the sensitivity adjustment module 123 may control the display 160 to more easily enter a sleep state, by raising the sensitivity (or the sensitivity level) related to detection of the second arrangement state.

The information output module 125 may output at least one user interface related to the adjustment to the sensitivity. For example, in response to a user input, the information output module 125 may output at least one of a user interface for determining whether to apply sensitivity, a user interface related to an adjustment to a sensitivity level, and a user interface related to a change of a condition for the first arrangement state. According to various embodiments, the information output module 125 may output, through the display 160 or an audio device, at least one of currently-set sensitivity information and image or audio information related to a sensitivity information change history.

FIG. 2B illustrates sensor information depending on the first arrangement state according to an embodiment.

Referring to FIG. 2B, the sensitivity of the electronic device 100 may include first to sixth levels. The present disclosure is not limited to the illustrated six levels, and the number of levels may be increased or decreased according to a design change or user settings. Sensor values collected by the sensor 180 of the electronic device 100 may include, for example, an X-axis angle value, a Z-axis angle value, and an acceleration value. The sensor values may be obtained by using, for example, a geo-magnetic sensor, an acceleration sensor, and the like.

According to an embodiment, the number of condition-satisfying samples may be further included in sensitivity adjustment parameters, in addition to the above-described parameters (e.g., the X-axis angle value, the Z-axis angle value, the acceleration value, and the like) that are used to adjust the sensitivity. The number of condition-satisfying samples may vary depending on the length of time during which the electronic device 100 remains within an X-axis angle range, a Z-axis angle range, and an acceleration range (e.g., in the first arrangement state). For example, the processor 120 of the electronic device 100 may monitor, every specified time (e.g., 20 ms), whether condition-satisfying samples exist. In the case where a relatively large number of condition-satisfying samples exist, the sensitivity may relatively decrease (e.g., the number of times that the display 160 enters a wake-up state may relatively decrease). Furthermore, in the case where a relatively small number of condition-satisfying samples exist, the sensitivity may relatively increase (e.g., the number of times that the display 160 enters a wake-up state may relatively increase).

As described above, the electronic device 100 may adjust the sensitivity by changing the sensitivity level depending on wake-up frequency information. For example, the electronic device 100 may lower the sensitivity level in the case where wake-up frequency information for a specified period of time is greater than or equal to a specified number of times. Furthermore, the electronic device 100 may raise the sensitivity level in the case where wake-up frequency information for a specified period of time is less than or equal to a specified number of times. According to various embodiments, depending on settings, the electronic device 100 may be operated such that the sensitivity level is not adjusted to a specified level (e.g., the fourth level) or lower.

According to various embodiments, in regard to an adjustment to the sensitivity, the electronic device 100 may change at least one of the X-axis angle range, the Z-axis angle range, the acceleration range, and the number of samples, which are defined as status values at each level. For example, in regard to an adjustment to the sensitivity, the processor 120 of the electronic device 100, when requested to raise the sensitivity (e.g., when requested to increase a wake-up frequency), may increase at least one of the X-axis angle range, the Z-axis angle range, and the acceleration range. Furthermore, in regard to an adjustment to the sensitivity, the processor 120, when requested to lower the sensitivity (e.g., when requested to decrease a wake-up frequency), may decrease at least one of the X-axis angle range, the Z-axis angle range, and the acceleration range.

According to the above-described various embodiments, an electronic device according to an embodiment may include a sensor that collects sensor information related to an arrangement state of the electronic device, a display having a wake-up state in relation to the arrangement state of the electronic device, a processor electrically connected with the sensor or the display, and a memory electrically connected with the processor and storing at least one instruction associated with execution of the processor. The instruction, when executed, may cause the processor to collect wake-up frequency information of the display for a specified period of time, to compare the wake-up frequency information with a specified condition, and to adjust sensitivity associated with detection of the arrangement state of the electronic device, depending on whether the specified condition is satisfied.

According to various embodiments, the instruction, when executed, may cause the processor to decrease a wake-up frequency of the display by lowering the sensitivity when the wake-up frequency information of the display is greater than a specified reference value.

According to various embodiments, the instruction, when executed, may cause the processor to increase a wake-up frequency of the display by raising the sensitivity when the wake-up frequency information of the display is less than a specified reference value.

According to various embodiments, the instruction, when executed, may cause the processor to collect the wake-up frequency information for a predetermined period of time during which the electronic device is worn and to lower the sensitivity when the wake-up frequency information for the predetermined period of time during which the electronic device is worn is greater than a specified reference value.

According to various embodiments, the instruction, when executed, may cause the processor to lower the sensitivity for another specified period of time when the wake-up frequency information for the specified period of time is greater than a reference value.

According to various embodiments, the instruction, when executed, may cause the processor to output at least one of a user interface for determining whether to adjust the sensitivity and a user interface associated with adjusting a level of the sensitivity.

According to various embodiments, the instruction, when executed, may cause the processor to output a user interface that includes at least one of an item for adjusting a first axis angle range, an item for adjusting a second axis angle range, an item for adjusting an acceleration range, and an item for adjusting the number of samples that are obtained by sampling, every predetermined time, a state in which the electronic device is within the acceleration range while being within the first axis angle range and the second axis angle range, in which the four items are related to the arrangement state of the electronic device.

According to various embodiments, the instruction, when executed, may cause the processor to output a user interface that includes the wake-up frequency information of the display for the specified period of time and a current sensitivity.

According to various embodiments, the instruction, when executed, may cause the processor to allow the display to enter a wake-up state when an angle at which the display is directed by rotation of a user's wrist is within a first angle range with respect to the ground, an angle at which the display is directed by rotation of a forearm of the user is within a second angle range, and an acceleration value according to a movement of the electronic device is within a specified range, with the electronic device worn on the user's wrist.

According to various embodiments, the instruction, when executed, may cause the processor to raise sensitivity with which to sense an arrangement state of the electronic device that allows the display to enter a sleep state, to facilitate the entrance of the display into the sleep state when the wake-up frequency information of the display is greater than or equal to a specified value.

A specific arrangement state of the electronic device in relation to the sleep state may include a case where an angle at which the display is directed is within a third angle range with respect to the ground and an angle at which the display is directed by rotation of the forearm of the user is within a fourth angle range. Alternatively, the specific arrangement state may include a case where an angle at which the display of the electronic device is directed is within the third angle range and the fourth angle range with respect to the ground and acceleration according to a movement of the electronic device is within a specified acceleration value range. In another case, the specific arrangement state may include a case where an angle at which the display of the electronic device is directed is within the third angle range and the fourth angle range with respect to the ground, acceleration according to a movement of the electronic device is within the specified acceleration value range, and the electronic device remains in the angle ranges for a predetermined period of time or longer.

According to the above-described various embodiments, an electronic device according to an embodiment may include a sensor that collects sensor information related to an arrangement state of the electronic device, a display having a wake-up state in relation to the arrangement state of the electronic device, a processor electrically connected with the sensor or the display, and a memory electrically connected with the processor and storing at least one instruction associated with execution of the processor. The instruction, when executed, may cause the processor to collect wake-up frequency information of the display for a specified period of time, to compare the wake-up frequency information with a specified condition, and to adjust or maintain sensitivity associated with detection of the arrangement state of the electronic device, depending on whether the specified condition is satisfied.

According to various embodiments, the instruction, when executed, may cause the processor to decrease a wake-up frequency of the display by lowering the sensitivity when the wake-up frequency information of the display is greater than a specified reference value.

According to various embodiments, the instruction, when executed, may cause the processor to increase a wake-up frequency of the display by raising the sensitivity when the wake-up frequency information of the display is less than a specified reference value.

According to various embodiments, the instruction, when executed, may cause the processor to collect the wake-up frequency information for a predetermined period of time during which the electronic device is worn and to lower the sensitivity when the wake-up frequency information for the predetermined period of time during which the electronic device is worn is greater than a specified reference value.

According to various embodiments, the instruction, when executed, may cause the processor to lower the sensitivity for another specified period of time when the wake-up frequency information for the specified period of time is greater than a reference value.

According to various embodiments, the instruction, when executed, may cause the processor to output at least one of a user interface for determining whether to adjust the sensitivity and a user interface associated with adjusting a level of the sensitivity.

According to various embodiments, the instruction, when executed, may cause the processor to output a user interface that includes at least one of an item for adjusting a first axis angle range, an item for adjusting a second axis angle range, an item for adjusting an acceleration range, and an item for adjusting the number of samples that are obtained by sampling, every predetermined time, a state in which the electronic device is within the acceleration range while being within the first axis angle range and the second axis angle range, in which the four items are related to the arrangement state of the electronic device.

According to various embodiments, the instruction, when executed, may cause the processor to output a user interface that includes the wake-up frequency information of the display for the specified period of time and a current sensitivity.

According to various embodiments, the instruction, when executed, may cause the processor to allow the display to enter a wake-up state when an angle at which the display is directed by rotation of a user's wrist is within a first angle range with respect to the ground, an angle at which the display is directed by rotation of a forearm of the user is within a second angle range, and an acceleration value according to a movement of the electronic device is within a specified range, with the electronic device worn on the user's wrist.

According to various embodiments, the instruction, when executed, may cause the processor to raise sensitivity with which to sense an arrangement state of the electronic device that allows the display to enter a sleep state, to facilitate the entrance of the display into the sleep state when the wake-up frequency information of the display is greater than or equal to a specified value.

Figure 3:
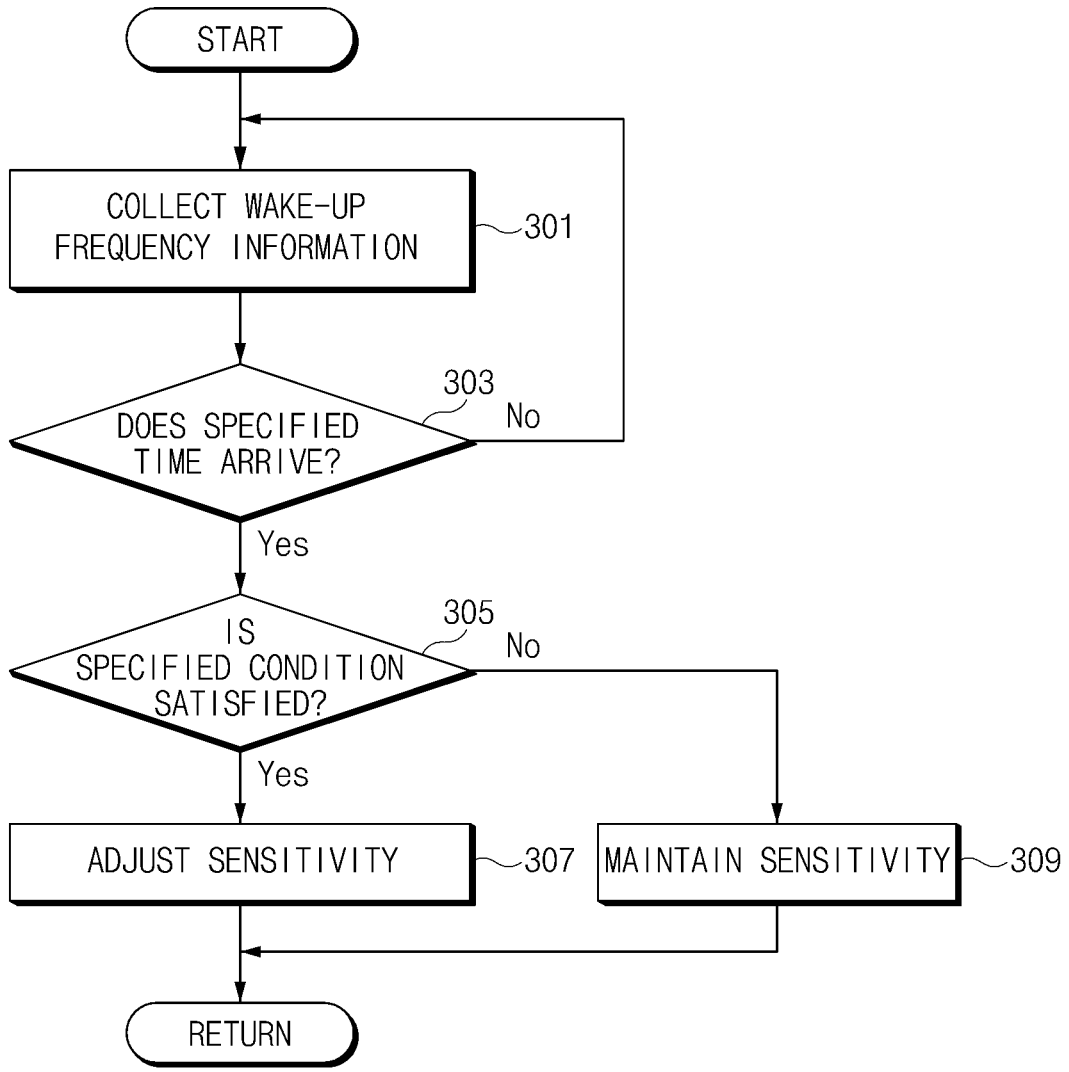
FIG. 3 illustrates an operation of an electronic device associated with a function operating method according to an embodiment.

FIG. 3 illustrates an operation of an electronic device associated with a function operating method according to an embodiment.

Referring to FIG. 3, in regard to a function operating method, in operation 301, the processor 120 (e.g., the frequency information collection module 121) of the electronic device 100 may collect information about a wake-up frequency of the display 160. In this regard, the processor 120 may determine whether the electronic device 100 enters a first arrangement state, based on sensor information collected by the sensor 180 and may change the display 160 into a wake-up state when it is determined that the electronic device 100 enters the first arrangement state. For a specified period of time, the processor 120 may count the number of times that the display 160 is changed into a wake-up state. In the above operation, the processor 120 may change the display 160 into a wake-up state in the case where the electronic device 100 remains in the first arrangement state for a specified period of time (e.g., for a period of time corresponding to the number of condition-satisfying samples).

In operation 303, the processor 120 (e.g., the sensitivity adjustment module 123) may determine whether specified time arrives. In the case where the specified time does not arrive, the processor 120 may return to operation 301 to collect wake-up frequency information depending on usage. The specified time may be diversely modified according to a design policy. For example, the specified time may be a specific time point on an hourly or daily basis.

In the case where the specified time arrives, the processor 120 may, in operation 305, determine whether a specified condition is satisfied. The specified condition may include, for example, a case where the wake-up frequency information is below or above a specified range. In this regard, the processor 120 may identify the sensitivity information 133 stored in the memory 130. The sensitivity information 133 may include an appropriate range of values depending on usability. The appropriate range of values may be used to compare the wake-up frequency information with the specified condition. The sensitivity information 133 may be differently set depending on a battery capacity of the electronic device 100. Alternatively, the sensitivity information 133 may be differently set depending on user information (e.g., gender, age, status, job, or the like).

In operation 307, the processor 120 may adjust the sensitivity of the sensor 180 when it is determined that the specified condition is satisfied, for example, when it is determined that the collected wake-up frequency information is below or above the specified range. According to an embodiment, the processor 120 may raise the sensitivity in the case where the wake-up frequency information is below the specified range. The number of times that the processor 120 activates the display 160 may be increased with the rise in sensitivity. According to an embodiment, the processor 120 may lower the sensitivity in the case where the wake-up frequency information is above the specified range. The number of times that the processor 120 activates the display 160 may be decreased with the fall in sensitivity.

In operation 309, the processor 120 may maintain the previous sensitivity when it is determined that the specified condition is not satisfied, for example, when it is determined that the collected wake-up frequency information is within the specified range.

Figure 4A:
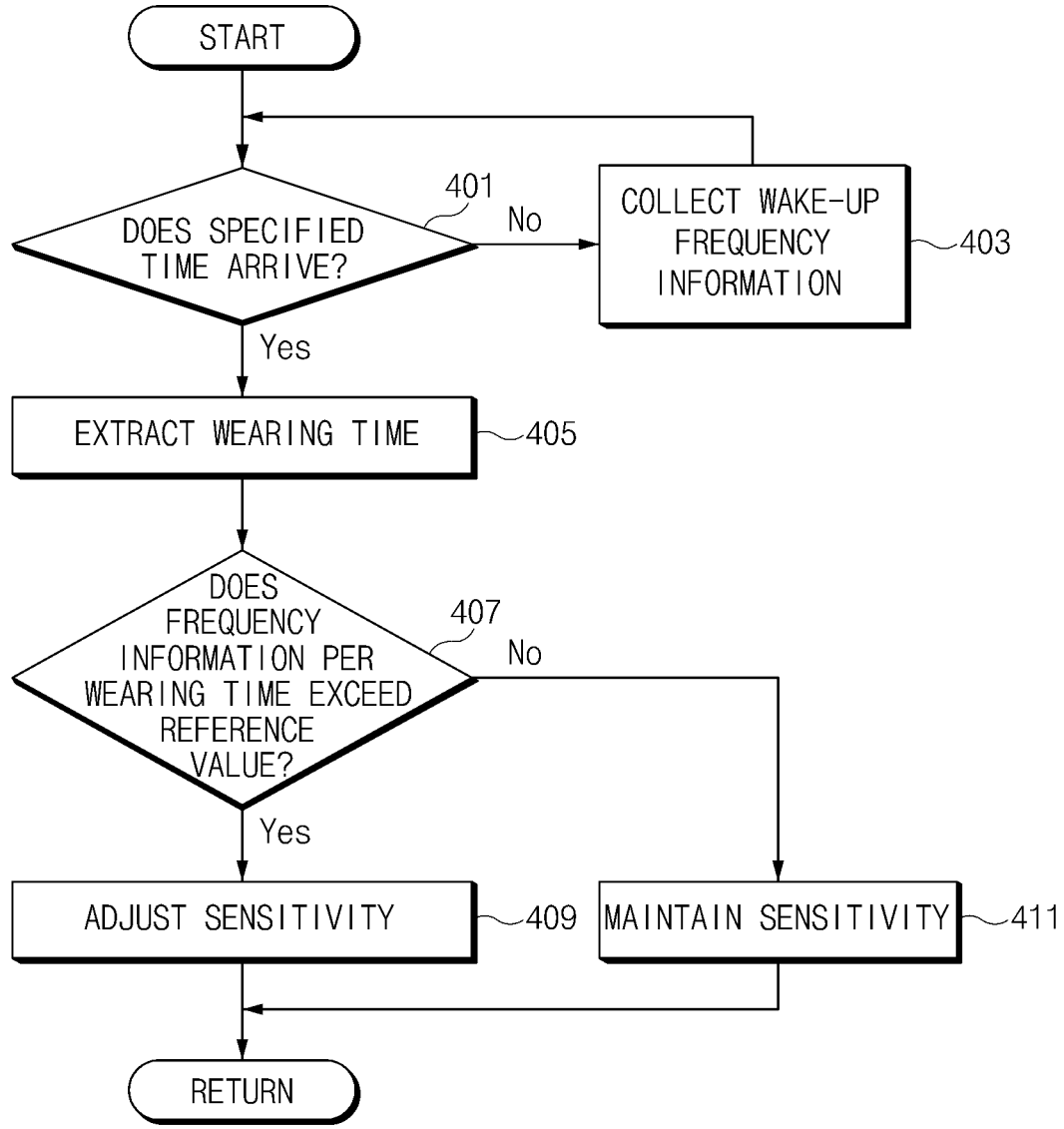
FIG. 4A illustrates a function operating method under a predetermined condition according to an embodiment.

FIG. 4A illustrates a function operating method under a predetermined condition according to an embodiment.

Referring to FIG. 4A, in regard to a function operating method, in operation 401, the processor 120 (e.g., the sensitivity adjustment module 123) may determine whether specified time arrives. In operation 403, the processor 120 may collect information about a wake-up frequency of the display 160 in the case where the specified time does not arrive. Thereafter, the processor 120 may return to operation 401 to perform the subsequent operations again. The processor 120 may repeatedly perform the above-described operations until turning off the electronic device 100 or ending function settings of the present disclosure.

When it is determined that the specified time arrives, the processor 120 may, in operation 405, extract wearing time. In this regard, the processor 120 may compute the wearing time of the electronic device 100 for a specified period of time (e.g., a day) by storing cumulative sensor information about a state in which the electronic device 100 is worn. Alternatively, the processor 120 may compute wearing time accumulated from a specified time point to the current time point. The processor 120 may determine whether the electronic device 100 is in a first arrangement state for the wearing time, based on sensor information provided by the sensor 180 and may wake up the display 160 when determining that the electronic device 100 is in the first arrangement state for a specified period of time or longer. The processor 120 may store the number of times and the time point that the display 160 is woken up.

In operation 407, the processor 120 may determine whether the wake-up frequency information per wearing time exceeds a reference value. In this regard, the processor 120 may collect and accumulate the wake-up frequency information in real time and may accumulate the wake-up frequency information every predetermined time, every specified time, or for the wearing time. In operation 409, the processor 120 may adjust the sensitivity of the sensor 180 in the case where the wake-up frequency information per wearing time exceeds the reference value.

In operation 411, the processor 120 may maintain the previous sensitivity in the case where the wake-up frequency information per wearing time does not exceed the reference value. Thereafter, the processor 120 may return to operation 401 to perform the subsequent operations again.

In regard to the adjustment to the sensitivity, the processor 120 may adjust the sensitivity to lower the wake-up frequency of the display 160 in the case where the wake-up frequency is above a specified number of times (or a specified range). In this regard, the processor 120 may adjust the sensor sensitivity of the sensor 180, or may adjust a sensing range (e.g., angle, acceleration, or the like) related to the first arrangement state of the electronic device 100.

According to various embodiments, the processor 120 may adjust the sensitivity daily. For example, every night at 12:00, the processor 120 may collect the total number of times that the display 160 is woken up for a day and may determine whether the collected wake-up frequency information is within a specified range (e.g., 500 times, 600 times, or the like). In the case where the wake-up frequency information is above the specified range (e.g., 700 times), the processor 120 may lower the sensitivity to control the display 160 to more infrequently enter a wake-up state. Furthermore, in the case where the wake-up frequency information is below the specified range (e.g., 50 times), the processor 120 may raise the sensitivity to control the display 160 to easily enter a wake-up state.

Figure 4B:
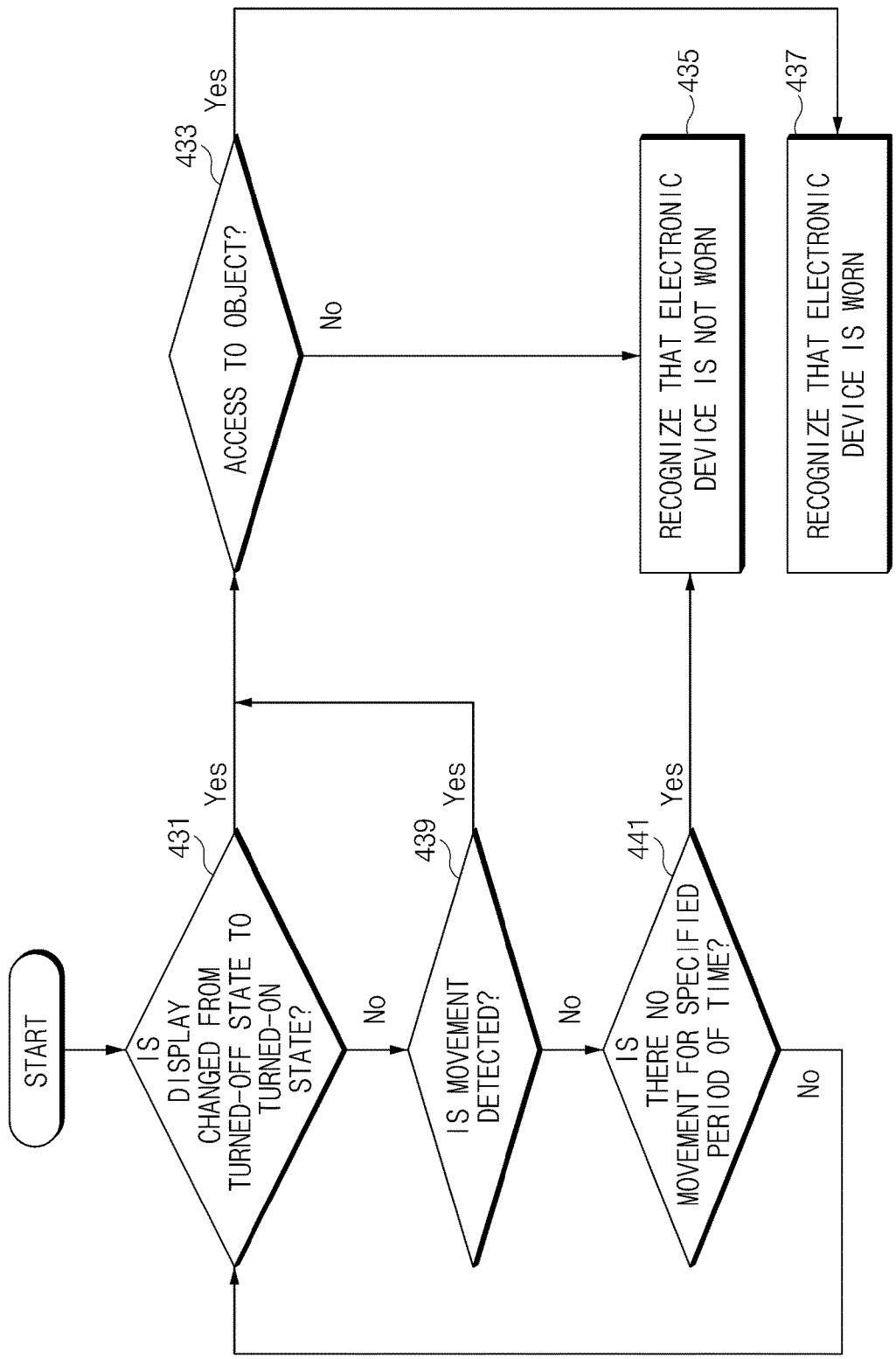
FIG. 4B illustrates a method for recognizing a wearing state according to an embodiment.

FIG. 4B illustrates a method for recognizing a wearing state according to an embodiment.

Referring to FIG. 4B, in regard to the determination of a wearing state, in operation 431, the processor 120 of the electronic device 100 may determine whether the display 160 is changed from a turned-off state (a sleep state) to a turned-on state (a wake-up state). In the case where the display 160 is changed from a turned-off state to a turned-on state, the processor 120 may, in operation 433, determine whether the electronic device 100 is close to an object (e.g., a wrist), through a proximity sensor (e.g., an IR sensor). When it is determined that the electronic device 100 is not close to an object, the processor 120 may, in operation 435, recognize that the electronic device 100 is not worn. When it is determined that the electronic device 100 is close to an object, the processor 120 may, in operation 437, determine that the electronic device 100 is worn.

In the case where the display 160 is in a turned-off state or is changed from a turned-on state to a turned-off state, the processor 120 may, in operation 439, determine whether there is a movement. In the case where there is a movement, the processor 120 may proceed to operation 433 to determine whether the electronic device 100 is worn or not, based on access of an object to the electronic device 100. According to various embodiments, when a movement is detected, the processor 120 may determine access of an object through the proximity sensor every predetermined period (e.g., 30 seconds). When it is determined that there is no object within a specified distance, the processor 120 may proceed to operation 435 to recognize that the electronic device 100 is not worn, and in the case where an object closely approaches the electronic device 100, the processor 120 may proceed to operation 437 to recognize that the electronic device 100 is worn.

In the case where the display 160 is in a turned-off state and a movement is not detected, the processor 120 may, in operation 441, determine whether there is no movement for a specified period of time (e.g., ten minutes). When it is determined that there is no movement, the processor 120 may proceed to operation 435 to recognize that the electronic device 100 is not worn. In the case where there is a continuous movement, the electronic device 100 may continually monitor a change in the display 160.

Figure 5:
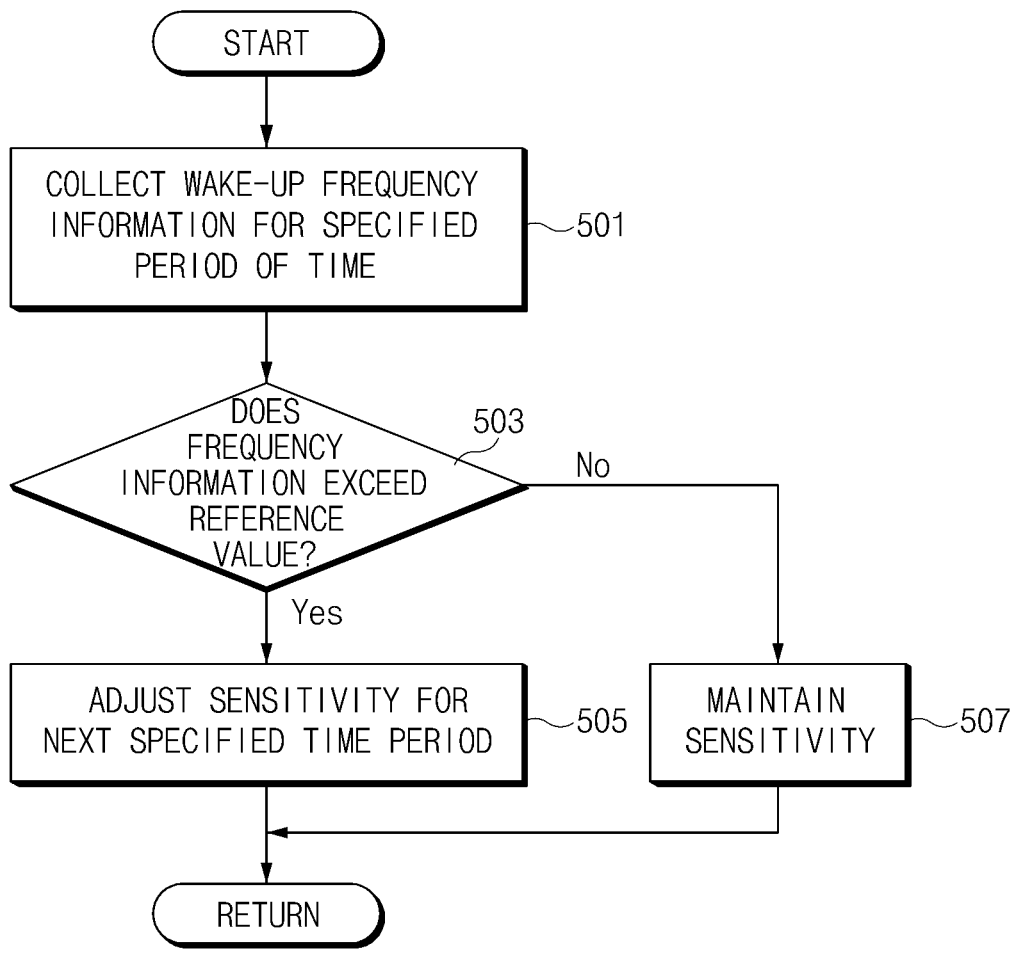
FIG. 5 illustrates a method for operating a function every predetermined time according to an embodiment.

FIG. 5 illustrates a method for operating a function every predetermined time according to an embodiment.

Referring to FIG. 5, in regard to a function operating method, in operation 501, the processor 120 (e.g., the frequency information collection module 121) of the electronic device 100 may collect wake-up frequency information of the display 160 for a specified time period. According to an embodiment, the processor 120 may collect wake-up frequency information for the previous specified time period (e.g., for the previous one hour), based on the current time point. Alternatively, the processor 120 may collect wake-up frequency information for the previous specified time period (e.g., for the previous one or two hours) every hour. In another case, the processor 120 may collect wake-up frequency information for a specified time period (e.g., for an hour) after the electronic device 100 is worn.

In operation 503, the processor 120 may determine whether the wake-up frequency information exceeds a reference value. In the case where the wake-up frequency information exceeds the reference value, the processor 120 may, in operation 505, adjust the sensitivity of the sensor 180 for the next specified time period. For example, the processor 120 may lower the sensitivity for the next specified time period. Accordingly, the processor 120 may allow the display 160 to more infrequently enter a wake-up state for the next specified time period under the same condition.

In the case where the wake-up frequency information does not exceed the reference value, the processor 120 may, in operation 507, maintain the sensitivity at the same level for the next specified time period.

According to various embodiments, the processor 120 may set a reference value for wake-up frequency information on a several-minutes basis and may determine whether the wake-up frequency information exceeds the reference value, every time several minutes elapse. The processor 120 may lower the sensitivity in the case where the number of times that the wake-up frequency information exceeds the reference value every several minutes is greater than or equal to a specified number of times. The processor 120 may raise the sensitivity in the case where the number of times that the wake-up frequency information exceeds the reference value every several minutes is less than the specified number of times.

According to various embodiments, the electronic device 100 may modify the reference value depending on various operating environments of the electronic device 100 or a user's states. For example, the processor 120 of the electronic device 100 may differently set a reference value on an hourly or daily basis according to a user schedule obtained from a scheduler program. According to an embodiment, the processor 120 may relatively increase a reference value for a date or time when a business trip or a meeting is scheduled. Alternatively, the processor 120 may raise the sensitivity level to allow the display 160 to relatively easily and frequently enter a wake-up state. The processor 120 may relatively lower a reference value in relation to a schedule, such as a holiday, a rest, or the like. In another case, the processor 120 may lower the sensitivity level to make it difficult and rare for the display 160 to enter a wake-up state. According to various embodiments, the processor 120 may modify a reference value depending on a user's exercise state (e.g., obtaining exercise state information by operating an exercise program or determining an exercise state, such as running or cycling, based on sensor information), sleep state, moving state, heart rate change, or the like. For example, when the user does an exercise, the processor 120 may relatively lower a reference value (or the sensitivity level) to make it difficult and rare for the display 160 to enter a wake-up state during the exercise. Accordingly, the electronic device 100 may reduce the number of times that the electronic device 100 worn on the user's wrist unintentionally enters a wake-up state due to an activity of the user. Alternatively, when the user drives a car (e.g., determining a driving state based on short-range communication between the car and the electronic device or determining a driving state by executing a navigation program of the electronic device), the processor 120 may relatively lower a reference value (or the sensitivity level) to reduce the number of times that the display 160 unnecessarily enters a wake-up state through an operation of a handle while driving.

According to the above-described various embodiments, a method for operating a function according to an embodiment may include collecting wake-up frequency information of a display of an electronic device for a specified period of time, comparing the wake-up frequency information with a specified condition, and adjusting sensitivity associated with detection of an arrangement state of the electronic device, in response to the comparing of the wake-up frequency information with the specified condition.

According to various embodiments, the adjusting of the sensitivity may include lowering the sensitivity by a specified magnitude to decrease a wake-up frequency of the display when the wake-up frequency information of the display is greater than a specified reference value.

According to various embodiments, the adjusting of the sensitivity may include raising the sensitivity by a specified magnitude to increase a wake-up frequency of the display by a specified number of times when the wake-up frequency information of the display is less than a specified reference value.

According to various embodiments, the collecting of the wake-up frequency information may include collecting the wake-up frequency information for a predetermined period of time during which the electronic device is worn, and the adjusting of the sensitivity may include lowering the sensitivity by a specified magnitude when the wake-up frequency information for the predetermined period of time during which the electronic device is worn is greater than a specified reference value.

According to various embodiments, the adjusting of the sensitivity may include lowering the sensitivity for another specified period of time by a specified magnitude when the wake-up frequency information for the specified period of time is greater than a reference value.

According to various embodiments, the method may further include outputting at least one of a user interface for determining whether to adjust the sensitivity and a user interface associated with adjusting a level of the sensitivity.

According to various embodiments, the method may further include outputting a user interface that includes at least one of an item for adjusting a first axis angle range, an item for adjusting a second axis angle range, an item for adjusting an acceleration range, and an item for adjusting the number of samples that are obtained by sampling, every predetermined time, a state in which the electronic device is within the acceleration range while being within the first axis angle range and the second axis angle range, in which the four items are related to the arrangement state of the electronic device.

According to various embodiments, the method may further include outputting a user interface that includes the wake-up frequency information of the display for the specified period of time and a current sensitivity.

According to various embodiments, the method may further include allowing the display to enter a wake-up state or remain in a wake-up state for a specified period of time when an angle at which the display is directed by rotation of a user's wrist is within a first angle range with respect to the ground, an angle at which the display is directed by rotation of a forearm of the user is within a second angle range, and an acceleration value according to a movement of the electronic device is within a specified range, with the electronic device worn on the user's wrist.

According to various embodiments, the adjusting of the sensitivity may include raising sensitivity with which to sense an arrangement state of the electronic device that allows the display to enter a sleep state, to facilitate the entrance of the display into the sleep state when the wake-up frequency information of the display is greater than or equal to a specified value.

Figure 6:
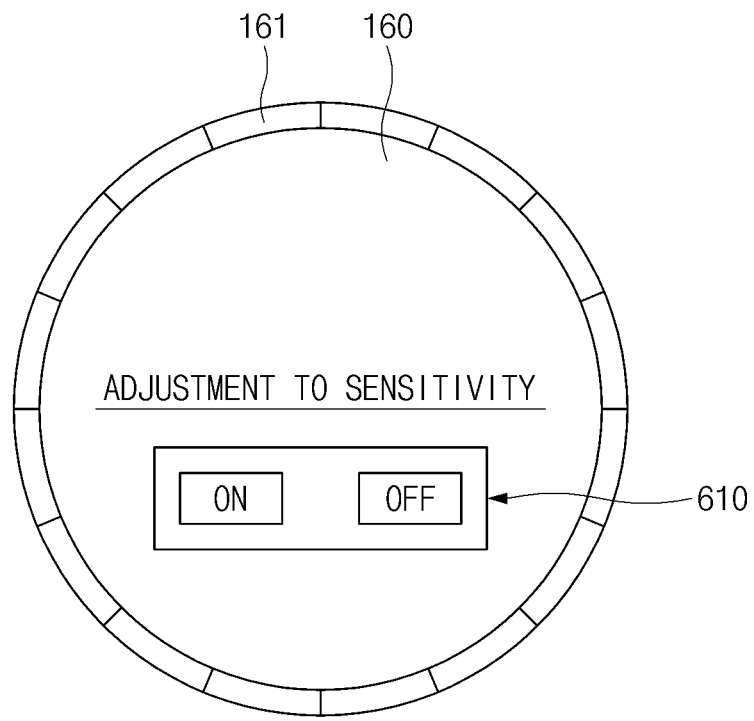
FIG. 6 illustrates a screen interface associated with whether to adjust sensitivity, according to an embodiment.

FIG. 6 illustrates a screen interface associated with whether to adjust sensitivity, according to an embodiment.

Referring to FIG. 6, the electronic device 100 may include the display 160 and a bezel 161 disposed on the exterior of the display 160. While FIG. 6 illustrates that the display 160 has a circular shape, various embodiments are not limited thereto. For example, the display 160 may have an oval or polygonal shape, in addition to a circular shape. The bezel 161 may, for example, rotate in a predetermined direction. The electronic device 100 may receive an input signal depending on the rotation of the bezel 161 and may perform input signal processing corresponding thereto.

The display 160 may have a turned-off state in the case where the display 160 is in a sleep state. The display 160 may have a turned-on state in the case where the display 160 is a wake-up state. In the wake-up state, the display 160 may output specified information, for example, watch information, message list information, a call list, or the like. Alternatively, the display 160 may output a menu screen.

As illustrated in FIG. 6, the display 160 may output a first user interface 610 for determining whether to apply sensitivity. The first user interface 610 may include a virtual button for selecting whether to apply an adjustment to sensitivity. An automatic sensitivity adjustment function may be applied when the first user interface 610 indicates, for example, an ON state. In this case, the processor 120 may raise or lower sensitivity, based on wake-up frequency information of the display 160. The sensitivity adjustment function may be deactivated when the first user interface 610 indicates an OFF state.

According to various embodiments, in the state in which the sensitivity adjustment function is deactivated, the electronic device 100 may output a user interface that guides activation of the sensitivity adjustment function, in the case where the wake-up frequency of the display 160 is above a specified frequency, or in the case where the length of time during which the wake-up frequency of the display 160 is above the specified frequency is longer than or equal to a predetermined period of time. According to various embodiments, the display 160 may provide a touch function and may support a selection of the sensitivity adjustment function ON/OFF in response to a touch event. Alternatively, the electronic device 100 may support a selection of the sensitivity adjustment function ON/OFF, depending on the direction in which the bezel 161 rotates. For example, when the bezel 161 is rotated leftwards, the electronic device 100 may determine that a user selects ON of the first user interface 610 and when the bezel 161 is rotated rightwards, the electronic device 100 may determine that the user selects OFF of the first user interface 610.

Figure 7:
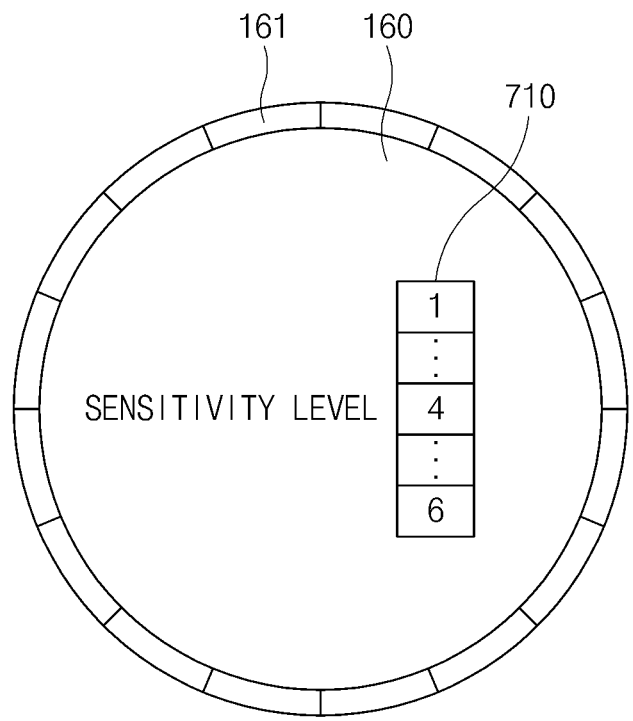
FIG. 7 illustrates a screen interface associated with adjusting a sensitivity level, according to an embodiment.

FIG. 7 illustrates a screen interface associated with adjusting a sensitivity level, according to an embodiment.

Referring to FIG. 7, the electronic device 100 may include the display 160 and the bezel 161 disposed on the exterior of the display 160. The electronic device 100 may output a second user interface 710 associated with adjusting a sensitivity level. In this regard, the electronic device 100 may output a menu item or an icon associated with the adjustment of the sensitivity level on the display 160 and may output the second user interface 710 associated with the adjustment of the sensitivity level when the corresponding menu item or icon is selected.

According to various embodiments, the electronic device 100 may output the second user interface 710 associated with the adjustment of the sensitivity level on the display 160 when an input signal based on the bezel 161 is generated within a specified period of time from the time when the display 160 enters a wake-up state. According to an embodiment, the electronic device 100 may output the second user interface 710 when a specified input signal based on the bezel 161 is generated while the electronic device 100 outputs a watch information screen in response to the entrance of the display 160 into the wake-up state.

The second user interface 710 output on the display 160 may locate the currently-set sensitivity level at a predetermined location and may modify the sensitivity level in response to a user input (e.g., a touch event or an input event to the bezel 161).

Figure 8:
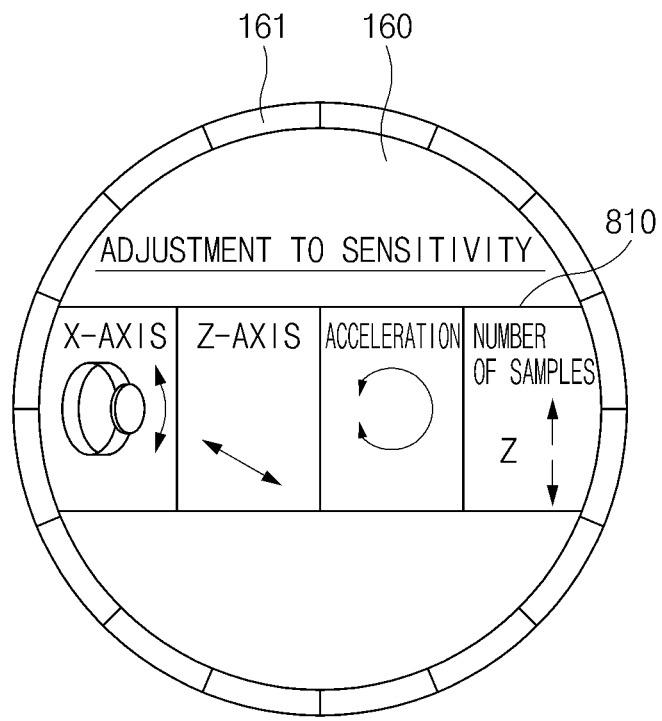
FIG. 8 illustrates a screen interface associated with sensitivity adjustment items, according to an embodiment.

FIG. 8 illustrates a screen interface associated with sensitivity adjustment items, according to an embodiment.

Referring to FIG. 8, the electronic device 100 may include the display 160 and the bezel 161. The display 160 may output, for example, a third user interface 810 associated with adjusting sensitivity parameters. According to an embodiment, the electronic device 100 may provide a menu or an icon associated with the adjustment of the sensitivity parameters and may output the third user interface 810 on the display 160 when the corresponding menu or icon is selected. Alternatively, when a specific level is selected in the adjustment of the sensitivity level, the electronic device 100 may output the third user interface 810 and may make a control to adjust the sensitivity parameters.

The third user interface 810 may include, for example, an item for adjusting an X-axis angle, an item for adjusting a Z-axis angle, an item for adjusting an acceleration range, an item for adjusting the number of samples, and the like. The item for adjusting an X-axis angle may include, for example, an item for adjusting a rotation angle of a wrist. The item for adjusting a Z-axis angle may include, for example, an item for adjusting a rotation angle of a forearm. An X-axis angle range and a Z-axis angle range may increase with an increase in sensitivity, and the number of times that the display 160 enters a wake-up state may increase with the increase in the X-axis angle range and the Z-axis angle range. The item for adjusting an acceleration range may include an item for adjusting a moving speed of the electronic device 100. An acceleration range may increase with an increase in sensitivity and may decrease with a decrease in sensitivity.

The number of samples may correspond to the number of samples in which the electronic device 100 is located in the X-axis angle range, the Z-axis angle range, and the acceleration range. The number of samples may be detected while sampling is performed every specified time. Accordingly, samples may be detected every sampling time in the case where the electronic device 100 moves within the acceleration range while located in the X-axis angle range and the Z-axis angle range. The item for adjusting the number of samples may include an item for modifying a sampling time interval (e.g., 20 ms, 40 ms, or the like), an item for modifying the number of satisfied samples (e.g., the minimum number of samples to be obtained for the entrance of the display 160 into a wake-up state from a sleep state), or the like.

Figure 9:
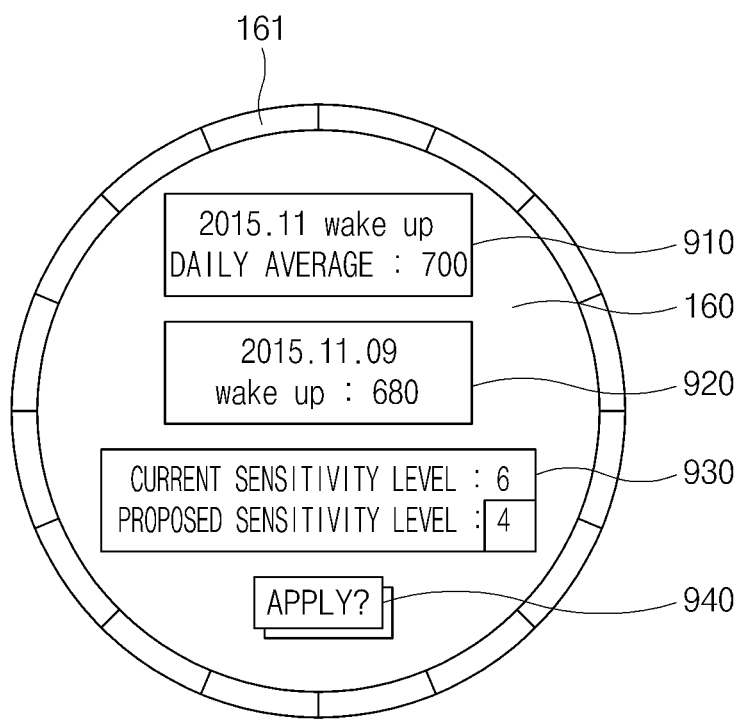
FIG. 9 illustrates a screen interface associated with displaying a sensitivity information history, according to an embodiment.

FIG. 9 illustrates a screen interface associated with displaying a sensitivity information history, according to an embodiment.

Referring to FIG. 9, the electronic device 100 may include the display 160 and the bezel 161. The electronic device 100 may output a user interface including information areas 910, 920, 930, and 940 associated with a sensitivity information history. For example, the electronic device 100 may output the average information 910 representing information about a daily wake-up frequency a month on average, the information 920 about a wake-up frequency of the day, the current sensitivity level and the proposed sensitivity level 930, and the virtual button 940 associated with applying the proposed sensitivity level. The information 920 about a wake-up frequency of the day may represent, for example, information about a wake-up frequency for 24 hours before specified time (e.g., ten o'clock p.m., nine o'clock a.m., or the like). According to various embodiments, the electronic device 100 may also additionally output daily wearing time and information about an average wake-up frequency for the wearing time. The daily wearing time and the information about an average wake-up frequency for the wearing time may be provided through a screen scroll, or may be output instead of the average information 910. The proposed sensitivity level may be adjusted in response to a user input (e.g., a touch on the display 160 or rotation of the bezel 161). The sensitivity level described above with reference to FIG. 2B may be modified when the virtual button 940 is selected. According to various embodiments, when a change of the proposed sensitivity level is selected, the electronic device 100 may output the third user interface 810 to support a change of parameters (e.g., an X-axis angle, a Z-axis angle, an acceleration value, the number of samples, and the like) to which the sensitivity level is applied. For example, the above-described information areas may be output when specified time arrives, or may be output by selecting a user menu.

According to an embodiment, the electronic device 100 may output a fourth user interface 910, 920 while adjusting (or maintaining) sensitivity at specified time (e.g., time to determine whether to modify or maintain sensitivity). According to an embodiment, the electronic device 100 may also output the first user interface 610 to determine whether to adjust sensitivity.

As described above, the electronic device according to various embodiments may prevent excessive current consumption by adjusting, according to usability, sensitivity related to a criterion for determining an operation (a wrist-up operation) for viewing the display of the electronic device worn on a wrist.

Figure 10:
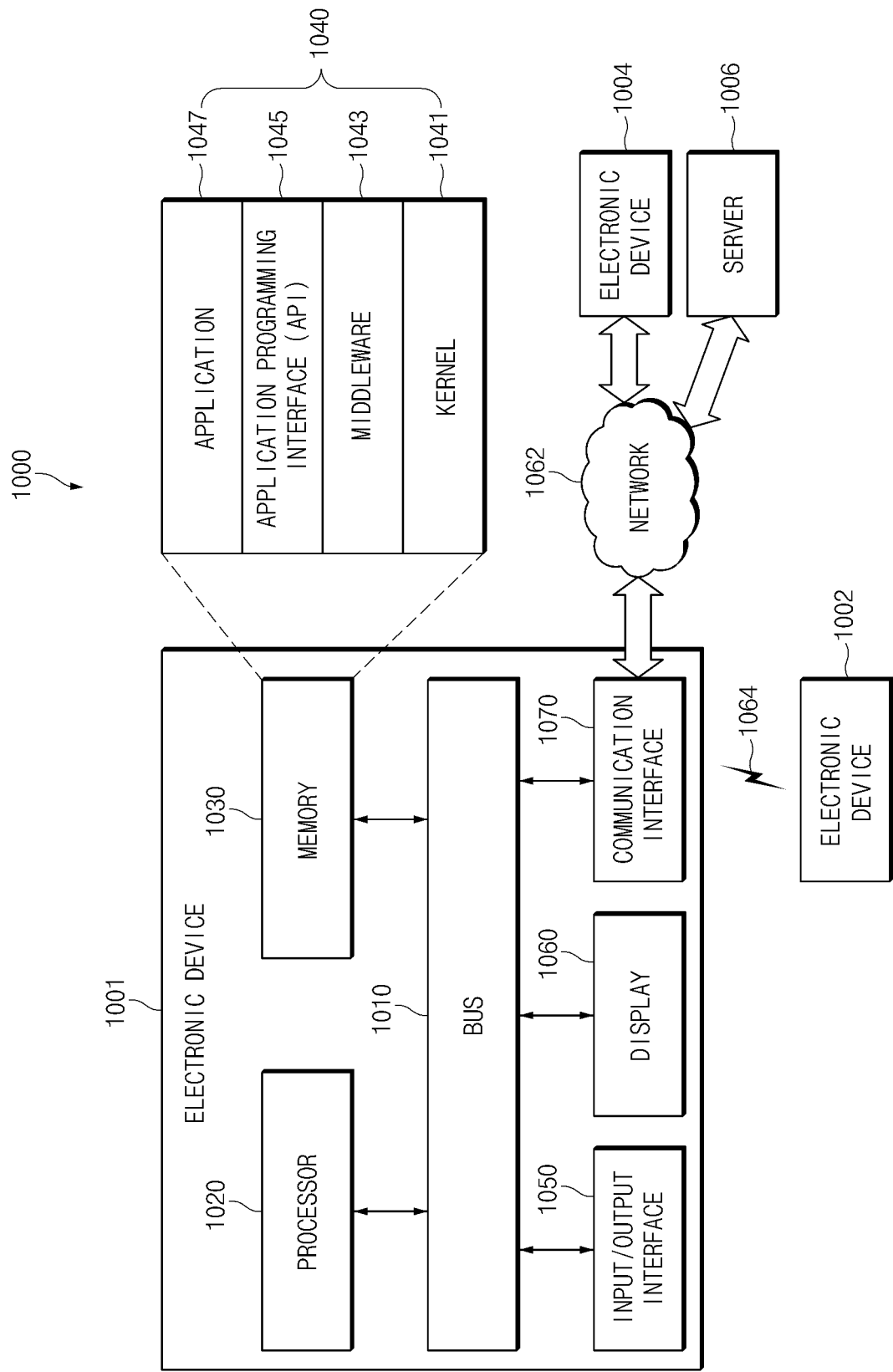
FIG. 10 illustrates an electronic device in a network environment according to various embodiments.

FIG. 10 illustrates an electronic device in a network environment system, according to various embodiments.

Referring to FIG. 10, according to various embodiments, an electronic device 1001 (e.g., the electronic device 100), a first electronic device 1002, a second electronic device 1004, or a server 1006 may be connected each other over a network 1062 or a short range communication 1064. The electronic device 1001 may include a bus 1010, a processor 1020, a memory 1030, an input/output interface 1050, a display 1060, and a communication interface 1070. According to an embodiment, the electronic device 1001 may not include at least one of the above-described elements or may further include other element(s).

For example, the bus 1010 may interconnect the above-described elements 1010 to 1070 and may include a circuit for conveying communications (e.g., a control message and/or data) among the above-described elements.

The processor 1020 may include one or more of a central processing unit (CPU), an application processor (AP), or a communication processor (CP). For example, the processor 1020 may perform an arithmetic operation or data processing associated with control and/or communication of at least other elements of the electronic device 1001.

The memory 1030 may include a volatile and/or nonvolatile memory. For example, the memory 1030 may store commands or data associated with at least one other element(s) of the electronic device 1001. According to an embodiment, the memory 1030 may store software and/or a program 1040. The program 1040 may include, for example, a kernel 1041, a middleware 1043, an application programming interface (API) 1045, and/or an application program (or "an application") 1047. At least a part of the kernel 1041, the middleware 1043, or the API 1045 may be referred to as an "operating system (OS)".

For example, the kernel 1041 may control or manage system resources (e.g., the bus 1010, the processor 1020, the memory 1030, and the like) that are used to execute operations or functions of other programs (e.g., the middleware 1043, the API 1045, and the application program 1047). Furthermore, the kernel 1041 may provide an interface that allows the middleware 1043, the API 1045, or the application program 1047 to access discrete elements of the electronic device 1001 so as to control or manage system resources.

The middleware 1043 may perform, for example, a mediation role such that the API 1045 or the application program 1047 communicates with the kernel 1041 to exchange data.

Furthermore, the middleware 1043 may process task requests received from the application program 1047 according to a priority. For example, the middleware 1043 may assign the priority, which makes it possible to use a system resource (e.g., the bus 1010, the processor 1020, the memory 1030, or the like) of the electronic device 1001, to at least one of the application program 1047. For example, the middleware 1043 may process the one or more task requests according to the priority assigned to the at least one, which makes it possible to perform scheduling or load balancing on the one or more task requests.

The API 1045 may be, for example, an interface through which the application program 1047 controls a function provided by the kernel 1041 or the middleware 1043, and may include, for example, at least one interface or function (e.g., an instruction) for a file control, a window control, image processing, a character control, or the like.

The input/output interface 1050 may play a role, for example, of an interface which transmits a command or data input from a user or another external device, to other element(s) of the electronic device 1001. Furthermore, the input/output interface 1050 may output a command or data, received from other element(s) of the electronic device 1001, to a user or another external device.

The display 1060 may include, for example, a liquid crystal display (LCD), a light-emitting diode (LED) display, an organic LED (OLED) display, a microelectromechanical systems (MEMS) display, or an electronic paper display. The display 1060 may display, for example, various contents (e.g., a text, an image, a video, an icon, a symbol, and the like) to a user. The display 1060 may include a touch screen and may receive, for example, a touch, gesture, proximity, or hovering input using an electronic pen or a part of a user's body.

For example, the communication interface 1070 may establish communication between the electronic device 1001 and an external device (e.g., the first electronic device 1002, the second electronic device 1004, or the server 1006). For example, the communication interface 1070 may be connected to the network 1062 over wireless communication or wired communication to communicate with the external device (e.g., the second electronic device 1004 or the server 1006).

The wireless communication may use at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. Furthermore, the wireless communication may include, for example, the short range communication 1064. The short range communication 1064 may include at least one of wireless fidelity (Wi-Fi), Bluetooth, near field communication (NFC), magnetic stripe transmission (MST), a global navigation satellite system (GNSS), or the like.

The MST may generate a pulse in response to transmission data using an electromagnetic signal, and the pulse may generate a magnetic field signal. The electronic device 1001 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in this disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 1062 may include at least one of telecommunications networks, for example, a computer network (e.g., LAN or WAN), an Internet, or a telephone network.

Each of the first and second electronic devices 1002 and 1004 may be a device of which the type is different from or the same as that of the electronic device 1001. According to an embodiment, the server 1006 may include a group of one or more servers. According to various embodiments, all or a portion of operations that the electronic device 1001 will perform may be executed by another or plural electronic devices (e.g., the first electronic device 1002, the second electronic device 1004 or the server 1006). According to an embodiment, in the case where the electronic device 1001 executes any function or service automatically or in response to a request, the electronic device 1001 may not perform the function or the service internally, but, alternatively additionally, it may request at least a portion of a function associated with the electronic device 1001 from another device (e.g., the electronic device 1002 or 1004 or the server 1006). The other electronic device may execute the requested function or additional function and may transmit the execution result to the electronic device 1001. The electronic device 1001 may provide the requested function or service using the received result or may additionally process the received result to provide the requested function or service. To this end, for example, cloud computing, distributed computing, or client-server computing may be used.

According to various embodiments, the first electronic device 1002 (or the second electronic device 1004) may be a device (e.g., a smartphone) that is capable of establishing a communication channel with the electronic device 1001 (e.g., the wearable electronic device). The electronic device 1001 may differently set sensitivity depending on a function setting state of the first electronic device 1002 connected thereto through the communication channel. For example, the electronic device 1001 may make a configuration to automatically lower sensitivity related to a wake-up state when the first electronic device 1002 connected thereto through the communication channel is in a power saving mode or a no disturbance mode. Alternatively, the electronic device 1001 may make a configuration to automatically raise sensitivity when the first electronic device 1002 connected thereto through the communication channel is in an activated state, with the power saving mode or the no disturbance mode disabled. In this regard, the electronic device 1001 may receive, from the first electronic device 1002, a message representing the current function setting state (e.g., a power saving mode/a no disturbance mode) of the first electronic device 1002. The no disturbance mode may include, for example, a function of restricting at least a part of specified functions (e.g., a telephone call connection function, a message service transmission or reception function, and the like) of the first electronic device 1002.

According to various embodiments, the electronic device 1001 may check a biometric sensor (an HRM sensor) and a schedule to adjust (e.g., lower) sensitivity when it is determined that an activity level is high. In this regard, the electronic device 1001 may collect biometric information from a sensor embedded therein, or may collect biometric information from the first electronic device 1002 connected thereto through the communication channel. The electronic device 1001 may obtain schedule information stored in a memory or may obtain schedule information from the first electronic device 1002 connected thereto through the communication channel. The electronic device 1001 may lower sensitivity when a biometric information analysis shows that an activity level is higher than a specified reference value (e.g., when a predetermined heart rate or more is maintained for a specified period of time or longer), and may raise sensitivity when an activity level is lower than the specified reference value. Furthermore, the electronic device 1001 may relatively lower sensitivity when the schedule information shows that there are specified works with a relatively high activity level, such as outside work, a business trip, a walk, an exercise, and the like.

According to various embodiments, in regard to setting an initial value of sensitivity, the electronic device 1001, when connected with the first electronic device 1002 for the first time, may set the initial value of the sensitivity, based on electronic device usage information (e.g., the number of times that the electronic device enters a wake-up state, the amount of time that the electronic device is used, the number of times that the home key is pressed, or the like). Alternatively, in an initial operation, the electronic device 1001 may set the initial value of the sensitivity, based on information about usage of the electronic device 1001 that is obtained for a predetermined period of time.

Figure 11:
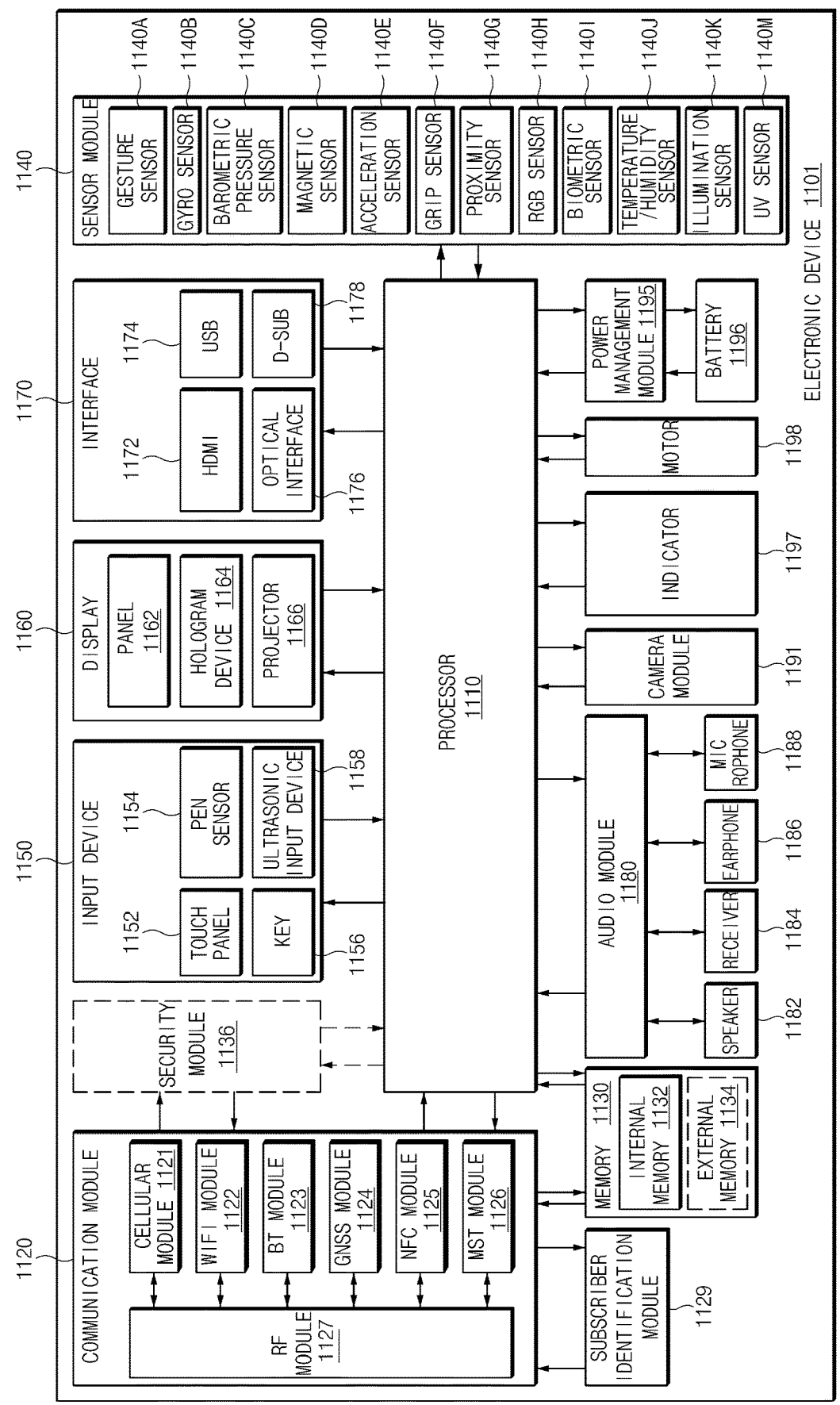
FIG. 11 illustrates a block diagram of an electronic device according to various embodiments.

FIG. 11 illustrates a block diagram of an electronic device, according to various embodiments.

Referring to FIG. 11, an electronic device 1101 may include, for example, all or a part of the electronic device 1001 illustrated in FIG. 10. The electronic device 1101 may include one or more processors (e.g., an application processor (AP)) 1110, a communication module 1120, a subscriber identification module 1129, a memory 1130, a sensor module 1140, an input device 1150, a display 1160, an interface 1170, an audio module 1180, a camera module 1191, a power management module 1195, a battery 1196, an indicator 1197, and a motor 1198.

The processor 1110 may drive, for example, an operating system (OS) or an application to control a plurality of hardware or software elements connected to the processor 1110 and may process and compute a variety of data. For example, the processor 1110 may be implemented with a System on Chip (SoC). According to an embodiment, the processor 1110 may further include a graphic processing unit (GPU) and/or an image signal processor. The processor 1110 may include at least a part (e.g., a cellular module 1121) of elements illustrated in FIG. 11. The processor 1110 may load a command or data, which is received from at least one of other elements (e.g., a nonvolatile memory), into a volatile memory and process the loaded command or data. The processor 1110 may store a variety of data in the nonvolatile memory.

The communication module 1120 may be configured the same as or similar to the communication interface 1070 of FIG. 10. The communication module 1120 may include the cellular module 1121, a Wi-Fi module 1122, a Bluetooth (BT) module 1123, a GNSS module 1124 (e.g., a GPS module, a Glonass module, a Beidou module, or a Galileo module), a near field communication (NFC) module 1125, a MST module 1126 and a radio frequency (RF) module 1127.

The cellular module 1121 may provide, for example, voice communication, video communication, a character service, an Internet service, or the like over a communication network. According to an embodiment, the cellular module 1121 may perform discrimination and authentication of the electronic device 1101 within a communication network by using the subscriber identification module (e.g., a SIM card) 1129. According to an embodiment, the cellular module 1121 may perform at least a portion of functions that the processor 1110 provides. According to an embodiment, the cellular module 1121 may include a communication processor (CP).

Each of the Wi-Fi module 1122, the BT module 1123, the GNSS module 1124, the NFC module 1125, or the MST module 1126 may include a processor for processing data exchanged through a corresponding module, for example. According to an embodiment, at least a part (e.g., two or more) of the cellular module 1121, the Wi-Fi module 1122, the BT module 1123, the GNSS module 1124, the NFC module 1125, or the MST module 1126 may be included within one Integrated Circuit (IC) or an IC package.

For example, the RF module 1127 may transmit and receive a communication signal (e.g., an RF signal). For example, the RF module 1127 may include a transceiver, a power amplifier module (PAM), a frequency filter, a low noise amplifier (LNA), an antenna, or the like. According to another embodiment, at least one of the cellular module 1121, the Wi-Fi module 1122, the BT module 1123, the GNSS module 1124, the NFC module 1125, or the MST module 1126 may transmit and receive an RF signal through a separate RF module.

The subscriber identification module 1129 may include, for example, a card and/or embedded SIM that includes a subscriber identification module and may include unique identify information (e.g., integrated circuit card identifier (ICCID)) or subscriber information (e.g., integrated mobile subscriber identity (IMSI)).

The memory 1130 (e.g., the memory 1030) may include an internal memory 1132 or an external memory 1134. For example, the internal memory 1132 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 1134 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 1134 may be operatively and/or physically connected to the electronic device 1101 through various interfaces.

A security module 1136 may be a module that includes a storage space of which a security level is higher than that of the memory 1130 and may be a circuit that guarantees safe data storage and a protected execution environment. The security module 1136 may be implemented with a separate circuit and may include a separate processor. For example, the security module 1136 may be in a smart chip or a secure digital (SD) card, which is removable, or may include an embedded secure element (eSE) embedded in a fixed chip of the electronic device 1101. Furthermore, the security module 1136 may operate based on an operating system (OS) that is different from the OS of the electronic device 1101. For example, the security module 1136 may operate based on java card open platform (JCOP) OS.

The sensor module 1140 may measure, for example, a physical quantity or may detect an operation state of the electronic device 1101. The sensor module 1140 may convert the measured or detected information to an electric signal. For example, the sensor module 1140 may include at least one of a gesture sensor 1140A, a gyro sensor 1140B, a barometric pressure sensor 1140C, a magnetic sensor 1140D, an acceleration sensor 1140E, a grip sensor 1140F, the proximity sensor 1140G, a color sensor 1140H (e.g., red, green, blue (RGB) sensor), a biometric sensor 1140I, a temperature/humidity sensor 1140J, an illuminance sensor 1140K, or an UV sensor 1140M. Although not illustrated, additionally or generally, the sensor module 1140 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1140 may further include a control circuit for controlling at least one or more sensors included therein. According to an embodiment, the electronic device 1101 may further include a processor that is a part of the processor 1110 or independent of the processor 1110 and is configured to control the sensor module 1140. The processor may control the sensor module 1140 while the processor 1110 remains at a sleep state.

The input device 1150 may include, for example, a touch panel 1152, a (digital) pen sensor 1154, a key 1156, or an ultrasonic input unit 1158. For example, the touch panel 1152 may use at least one of capacitive, resistive, infrared and ultrasonic detecting methods. Also, the touch panel 1152 may further include a control circuit. The touch panel 1152 may further include a tactile layer to provide a tactile reaction to a user.

The (digital) pen sensor 1154 may be, for example, a part of a touch panel or may include an additional sheet for recognition. The key 1156 may include, for example, a physical button, an optical key, a keypad, or the like. The ultrasonic input device 1158 may detect (or sense) an ultrasonic signal, which is generated from an input device, through a microphone (e.g., a microphone 1188) and may check data corresponding to the detected ultrasonic signal.

The display 1160 (e.g., the display 1060) may include a panel 1162, a hologram device 1164, or a projector 1166. The panel 1162 may be the same as or similar to the display 1060 illustrated in FIG. 10. The panel 1162 may be implemented, for example, to be flexible, transparent or wearable. The panel 1162 and the touch panel 1152 may be integrated into a single module. The hologram device 1164 may display a stereoscopic image in a space using a light interference phenomenon. The projector 1166 may project light onto a screen so as to display an image. For example, the screen may be arranged in the inside or the outside of the electronic device 1101. According to an embodiment, the display 1160 may further include a control circuit for controlling the panel 1162, the hologram device 1164, or the projector 1166.

The interface 1170 may include, for example, a high-definition multimedia interface (HDMI) 1172, a universal serial bus (USB) 1174, an optical interface 1176, or a D-subminiature (D-sub) 1178. The interface 1170 may be included, for example, in the communication interface 1070 illustrated in FIG. 10. Additionally or generally, the interface 1170 may include, for example, a mobile high definition link (MHL) interface, a SD card/multi-media card (MMC) interface, or an infrared data association (IrDA) standard interface.

The audio module 1180 may convert a sound and an electric signal in dual directions. At least a part of the audio module 1180 may be included, for example, in the input/output interface 1050 illustrated in FIG. 10. The audio module 1180 may process, for example, sound information that is input or output through a speaker 1182, a receiver 1184, an earphone 1186, or the microphone 1188.

For example, the camera module 1191 may shoot a still image or a video. According to an embodiment, the camera module 1191 may include at least one or more image sensors (e.g., a front sensor or a rear sensor), a lens, an image signal processor (ISP), or a flash (e.g., an LED or a xenon lamp).

The power management module 1195 may manage, for example, power of the electronic device 1101. According to an embodiment, a power management integrated circuit (PMIC), a charger IC, or a battery or fuel gauge may be included in the power management module 1195. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 1196 and a voltage, current or temperature thereof while the battery is charged. The battery 1196 may include, for example, a rechargeable battery and/or a solar battery.

The indicator 1197 may display a specific state of the electronic device 1101 or a part thereof (e.g., the processor 1110), such as a booting state, a message state, a charging state, and the like. The motor 1198 may convert an electrical signal into a mechanical vibration and may generate the following effects: vibration, haptic, and the like. Although not illustrated, a processing device (e.g., a GPU) for supporting a mobile TV may be included in the electronic device 1101. The processing device for supporting the mobile TV may process media data according to the standards of digital multimedia broadcasting (DMB), digital video broadcasting (DVB), MediaFlo™ or the like.

Each of the above-mentioned elements of the electronic device according to various embodiments of the present disclosure may be configured with one or more components, and the names of the elements may be changed according to the type of the electronic device. In various embodiments, the electronic device may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

Figure 12:
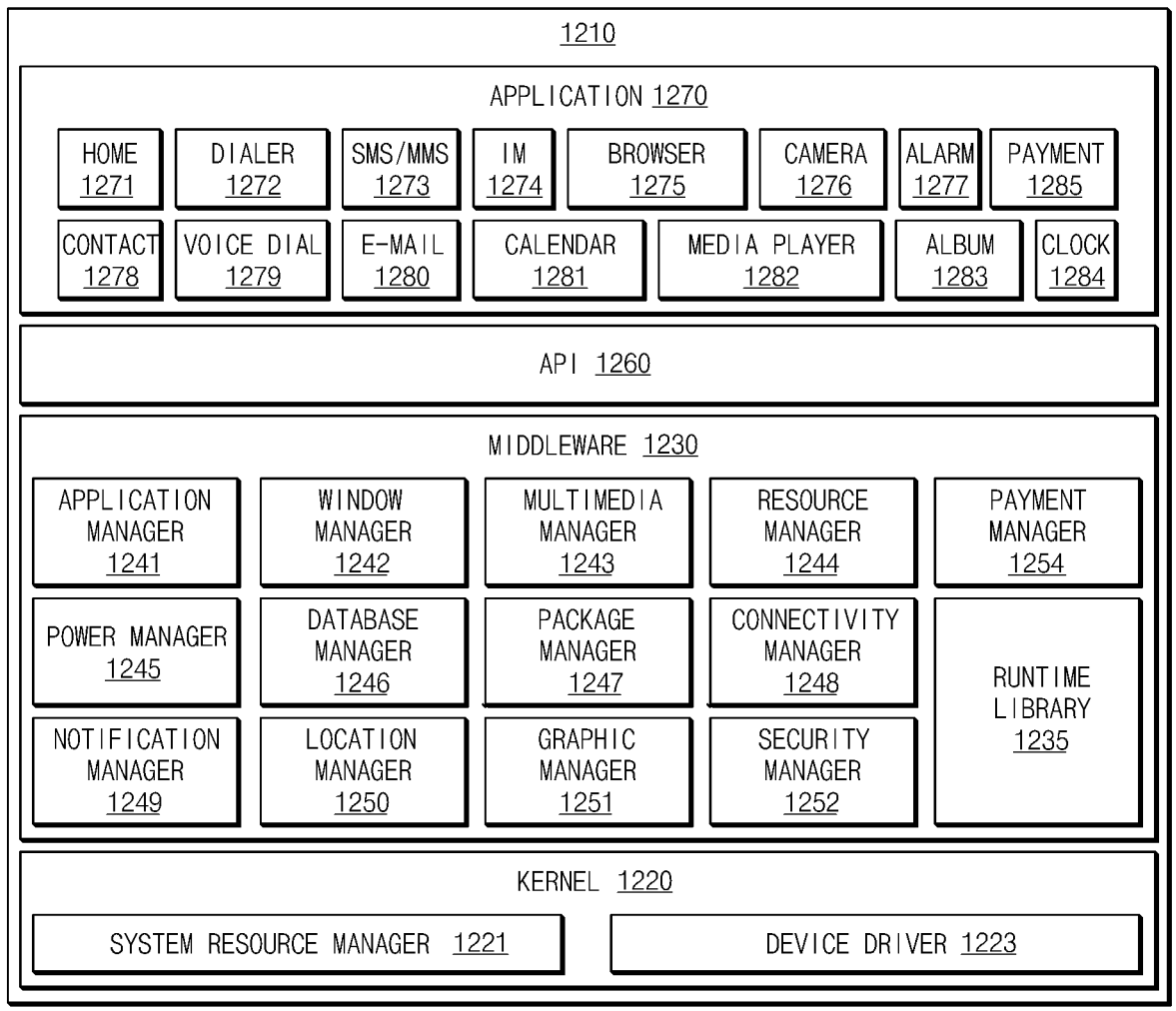
FIG. 12 illustrates a block diagram of a program module according to various embodiments.

FIG. 12 illustrates a block diagram of a program module, according to various embodiments.

According to an embodiment, a program module 1210 (e.g., the program 1040) may include an operating system (OS) to control resources associated with an electronic device (e.g., the electronic device 1001), and/or diverse applications (e.g., the application program 1047) driven on the OS. The OS may be, for example, Android™, iOS™, Windows™, Symbian™ Tizen™ or Bada™.

The program module 1210 may include a kernel 1220, a middleware 1230, an application programming interface (API) 1260, and/or an application 1270. At least a portion of the program module 1210 may be preloaded on an electronic device or may be downloadable from an external electronic device (e.g., the first electronic device 1002, the second electronic device 1004, the server 1006, or the like).

The kernel 1220 (e.g., the kernel 1041) may include, for example, a system resource manager 1221 or a device driver 1223. The system resource manager 1221 may perform control, allocation, or retrieval of system resources. According to an embodiment, the system resource manager 1221 may include a process managing unit, a memory managing unit, or a file system managing unit. The device driver 1223 may include, for example, a display driver, a camera driver, a Bluetooth driver, a shared memory driver, a USB driver, a keypad driver, a Wi-Fi driver, an audio driver, or an inter-process communication (IPC) driver.

The middleware 1230 may provide, for example, a function that the application 1270 needs in common, or may provide diverse functions to the application 1270 through the API 1260 to allow the application 1270 to efficiently use limited system resources of the electronic device. According to an embodiment, the middleware 1230 (e.g., the middleware 1043) may include at least one of a runtime library 1235, an application manager 1241, a window manager 1242, a multimedia manager 1243, a resource manager 1244, a power manager 1245, a database manager 1246, a package manager 1247, a connectivity manager 1248, a notification manager 1249, a location manager 1250, a graphic manager 1251, a security manager 1252, or a payment manager 1254.

The runtime library 1235 may include, for example, a library module that is used by a compiler to add a new function through a programming language while the application 1270 is being executed. The runtime library 1235 may perform input/output management, memory management, or capacities about arithmetic functions.

The application manager 1241 may manage, for example, a life cycle of at least one application of the application 1270. The window manager 1242 may manage a graphic user interface (GUI) resource that is used in a screen. The multimedia manager 1243 may identify a format necessary for playing diverse media files, and may perform encoding or decoding of media files by using a codec suitable for the format. The resource manager 1244 may manage resources such as a storage space, memory, or source code of at least one application of the application 1270.

The power manager 1245 may operate, for example, with a basic input/output system (BIOS) to manage a battery or power, and may provide power information for an operation of an electronic device. The database manager 1246 may generate, search for, or modify database that is to be used in at least one application of the application 1270. The package manager 1247 may install or update an application that is distributed in the form of package file.

The connectivity manager 1248 may manage, for example, wireless connection such as Wi-Fi or Bluetooth. The notification manager 1249 may display or notify an event such as arrival message, appointment, or proximity notification in a mode that does not disturb a user. The location manager 1250 may manage location information about an electronic device. The graphic manager 1251 may manage a graphic effect that is provided to a user, or manage a user interface relevant thereto. The security manager 1252 may provide a general security function necessary for system security, user authentication, or the like. According to an embodiment, in the case where an electronic device (e.g., the electronic device 1001) includes a telephony function, the middleware 1230 may further include a telephony manager for managing a voice or video call function of the electronic device.

The middleware 1230 may include a middleware module that combines diverse functions of the above-described elements. The middleware 1230 may provide a module specialized to each OS kind to provide differentiated functions. Additionally, the middleware 1230 may dynamically remove a part of the preexisting elements or may add new elements thereto.

The API 1260 (e.g., the API 1045) may be, for example, a set of programming functions and may be provided with a configuration that is variable depending on an OS. For example, in the case where an OS is Android™ or iOS™, it may provide one API set per platform. In the case where an OS is Tizen™, it may provide two or more API sets per platform.

The application 1270 (e.g., the application program 1047) may include, for example, one or more applications capable of providing functions fora home 1271, a dialer 1272, an SMS/MMS 1273, an instant message (IM) 1274, a browser 1275, a camera 1276, an alarm 1277, a contact 1278, a voice dial 1279, an e-mail 1280, a calendar 1281, a media player 1282, an album 1283, or a timepiece 1284, or for offering health care (e.g., measuring an exercise quantity, blood sugar, or the like) or environment information (e.g., information of barometric pressure, humidity, temperature, or the like).

According to an embodiment, the application 1270 may include an application (hereinafter referred to as "information exchanging application" for descriptive convenience) to support information exchange between an electronic device (e.g., the electronic device 1001) and an external electronic device (e.g., the first electronic device 1002 or the second electronic device 1004). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device. Additionally, the information exchanging application may receive, for example, notification information from an external electronic device and provide the notification information to a user.

The device management application may manage (e.g., install, delete, or update), for example, at least one function (e.g., turn-on/turn-off of an external electronic device itself (or a part of elements) or adjustment of brightness (or resolution) of a display) of the external electronic device which communicates with the electronic device, an application running in the external electronic device, or a service (e.g., a call service, a message service, or the like) provided from the external electronic device.

According to an embodiment, the application 1270 may include an application (e.g., a health care application of a mobile medical device) that is assigned in accordance with an attribute of an external electronic device. According to an embodiment, the application 1270 may include an application that is received from an external electronic device (e.g., the first electronic device 1002, the second electronic device 1004, or the server 1006). According to an embodiment, the application 1270 may include a preloaded application or a third party application that is downloadable from a server. The names of elements of the program module 1210 according to the embodiment may be modifiable depending on kinds of operating systems.

According to various embodiments, at least a portion of the program module 1210 may be implemented by software, firmware, hardware, or a combination of two or more thereof. At least a portion of the program module 1210 may be implemented (e.g., executed), for example, by the processor (e.g., the processor 1110). At least a portion of the program module 1210 may include, for example, modules, programs, routines, sets of instructions, processes, or the like for performing one or more functions.

The term "module" used in this disclosure may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 1020), may cause the one or more processors to perform a function corresponding to the instruction. The computer-readable storage media, for example, may be the memory 1030.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, the one or more instructions may contain a code made by a compiler or a code executable by an interpreter. The above hardware unit may be configured to operate via one or more software modules for performing an operation according to various embodiments, and vice versa.

A module or a program module according to various embodiments may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. An electronic device comprising:
 a sensor configured to detect information related to an arrangement state of the electronic device;
 a display;
 a processor electrically connected with the sensor and the display; and
 a memory electrically connected with the processor and configured to store at least one instruction,
  wherein the at least one instruction, when executed, causes the processor to:

store in the memory a reference frequency indicating a specified range of a number of wake-up activations of the electronic device, detect, using at least the sensor, for a time period that the electronic device is worn, a count of wake-up activations of the display within the time period, generate, based on the count and the time period, a wake-up frequency of wake-up activations for the display during the time period, compare the generated wake-up frequency of wake-up activations with the reference frequency of wake-up activations, in response to detecting via the comparison, that the generated wake-up frequency is greater than the reference frequency, output a first user interface for receiving a user selection to activate or deactivate an automatic adjustment to sensitivity of the sensor, and in response to the user selection activating the automatic adjustment to sensitivity, automatically adjust the sensitivity of the sensor, wherein a plurality of hierarchical sensitivity levels is stored in the memory, each sensitivity level including a sensitivity value for controlling the sensor, and an orientation angle range for controlling wake-up activation of the electronic device, the processor further configured to:

display a second user interface for selecting one of the plurality of hierarchical sensitivity levels, and in response to detecting selection of a first sensitivity level from among the plurality, of hierarchical sensitivity levels, change both a present sensitivity value and a present orientation angle range according to the selected first sensitivity level.

2. The electronic device of claim 1, wherein the instruction, when executed, causes the processor to:

based on detecting that the generated wake-up frequency is greater than the reference frequency, decrease the sensitivity of the sensor, whereby a future count of wake-up activations is reduced; and after a wake-up activation of the display is executed, detect that the electronic device is worn by a user by detecting a proximity to an object.

3. The electronic device of claim 2, wherein the instruction, when executed, causes the processor to:

based on detecting that the generated wake-up frequency is less than the reference frequency, increase the sensitivity of the sensor, whereby the future count of wake-up activations is increased, after the display is deactivated and detecting that the electronic device is moving, detect that the electronic device is worn by the user when the proximity to the object is detected, when the display is deactivated and the electronic device is detected as stationary, detect that the electronic device is not worn by the user.

4. The electronic device of claim 1, wherein a first value is utilized as the reference frequency when a battery of the electronic device holds a first power capacity, and a second value different from the first value is utilized as the reference frequency when the battery holds a second power capacity different from the first power capacity.

5. The electronic device of claim 1, wherein the instruction, when executed, causes the processor to:

lower the sensitivity for another specified period of time when the wake-up frequency for the time period is greater than the reference frequency.

6. The electronic device of claim 1, wherein the instruction, when executed, causes the processor to:

output a user interface that includes at least one of
a first item for adjusting a first axis angle range,
a second item for adjusting a second axis angle range,
a third item for adjusting an acceleration range, and
a fourth item for adjusting a number of samples that are obtained by sampling, every predetermined time, a state in which the electronic device is within the acceleration range while being within the first axis angle range and the second axis angle range, wherein the first, second, third and fourth items are related to the arrangement state of the electronic device.

7. A method in an electronic device, the method comprising:

storing, in a memory, a reference frequency indicating a specified range of a number of wake-up activations of the electronic device;

detecting, using at least a sensor, for a specified period of time that the electronic device is worn, a count of wake-up activations of a display;

generating, using a processor, based on the count and the specified period of time, a wake-up frequency of wake-up activations for the display during the specified period of time;

comparing the generated wake-up frequency of wake-up activations with the reference frequency of wake-up activations;

in response to detecting via the comparison that the generated wake-up frequency is greater than the reference frequency, outputting a first user interface for receiving a user selection to activate or deactivate an automatic adjustment to sensitivity of the sensor; and in response to the user selection, activating the automatic adjustment to sensitivity, automatically adjusting the sensitivity of the sensor, wherein a plurality of hierarchical sensitivity levels is stored in the memory, each sensitivity level including a sensitivity value for controlling the sensor, and an orientation angle range for controlling wake-up activation of the electronic device, the method further comprising:

displaying a second user interface for selecting one of the plurality of hierarchical sensitivity levels, and in response to detecting selection of a first sensitivity level from among the plurality, of hierarchical sensitivity levels, changing both a present sensitivity value and a present orientation angle range according to the selected first sensitivity level.

8. The method of claim 7, wherein the adjusting of the sensitivity includes:

based on detecting that the generated wake-up frequency is greater than the reference frequency, decreasing the sensitivity of the sensor, whereby a future count of wake-up activations is reduced; and after a wake-up activation of the display is executed, detecting that the electronic device is worn by a user by detecting a proximity to an object.

9. The method of claim 8, wherein the sensitivity is lowered by a specified magnitude when the wake-up frequency is greater than reference frequency, wherein the electronic device is detected as worn by the proximity to the object after the display is deactivated and the electronic device is detected as moving, and wherein the electronic device is detected as not worn by the user, when the display is deactivated and the electronic device is detected as stationary.

10. The method of claim 7, wherein a first value is utilized as the reference frequency when a battery of the electronic device holds a first power capacity, and a second value different from the first value is utilized as the reference frequency when the battery holds a second power capacity different from the first power capacity.

11. The method of claim 7, wherein the adjusting of the sensitivity includes:
raising sensitivity with which to sense an arrangement state of the electronic device that allows the display to enter a sleep state, to facilitate execution of the sleep state when the wake-up frequency of the display is greater than or equal to the reference frequency.

12. The electronic device of claim 1, wherein the instruction, when executed, causes the processor to:
output a user interface that includes the wake-up frequency of the display for the time period and a current sensitivity.

13. The electronic device of claim 12, wherein the instruction, when executed, causes the processor to:
raise sensitivity with which to sense an arrangement state of the electronic device that allows the display to enter a sleep state, to facilitate execution of the sleep state when the wake-up frequency of the display is greater than or equal to the reference frequency.

14. The electronic device of claim 1, wherein the instruction, when executed, causes the processor to:
allow the display to enter a wake-up state or remain in a wake-up state when an angle at which the display is directed by rotation of a user's wrist is within a first angle range with respect to a ground, an angle at which the display is directed by rotation of a forearm of the user is within a second angle range, and an acceleration value according to a movement of the electronic device is within a specified range, with the electronic device worn on a wrist of the user.

15. The method of claim 7, wherein the adjusting of the sensitivity includes: raising the sensitivity by a specified magnitude to increase the wake-up frequency of the display by a specified number of times when the wake-up frequency of the display is less than the reference frequency.

16. The method of claim 7, further comprising:
outputting a user interface that includes at least one of
a first item for adjusting a first axis angle range,
a second item for adjusting a second axis angle range,
a third item for adjusting an acceleration range, and
a fourth item for adjusting a number of samples that are obtained by sampling, every predetermined time, a state in which the electronic device is within the acceleration range while being within the first axis angle range and the second axis angle range,
wherein the first, second, third and fourth items are related to a state the electronic device.

17. The method of claim 7, further comprising:
outputting a user interface that includes the wake-up frequency of the display for the specified period of time and a current sensitivity.

18. The method of claim 7, further comprising:
allowing the display to enter a wake-up state or remain in a wake-up state for a specified period of time when an angle at which the display is directed by rotation of a user's wrist is within a first angle range with respect to a horizontal plane, an angle at which the display is directed by rotation of a forearm of the user is within a second angle range, and an acceleration value according to a movement of the electronic device is within a specified range, with the electronic device worn on a wrist of the user.

* * * * *